United States Patent
Kotaru et al.

(10) Patent No.: US 11,706,658 B2
(45) Date of Patent: Jul. 18, 2023

(54) 5G ADMISSION BY VERIFYING SLICE SLA GUARANTEES

(71) Applicant: Microsoft Technology Licensing, LLC, Redmond, WA (US)

(72) Inventors: Manikanta Kotaru, Kenmore, WA (US); Paramvir Bahl, Bellevue, WA (US); Arjun Varman Balasingam, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 223 days.

(21) Appl. No.: 17/325,165

(22) Filed: May 19, 2021

(65) Prior Publication Data

US 2022/0377597 A1 Nov. 24, 2022

(51) Int. Cl.
  *H04W 28/02* (2009.01)
  *H04W 24/02* (2009.01)
  *H04W 48/18* (2009.01)
  *H04W 72/04* (2023.01)

(52) U.S. Cl.
  CPC ....... *H04W 28/0268* (2013.01); *H04W 24/02* (2013.01); *H04W 48/18* (2013.01); *H04W 72/04* (2013.01)

(58) Field of Classification Search
  CPC . H04W 28/0268; H04W 24/02; H04W 48/18; H04W 72/04; H04W 28/24; H04W 24/04; H04W 24/08; H04W 24/10; H04W 72/1242
  See application file for complete search history.

(56) References Cited

U.S. PATENT DOCUMENTS

| 2021/0160153 A1* | 5/2021 | Akman | H04W 24/02 |
| 2021/0368514 A1* | 11/2021 | Xing | H04L 41/0895 |
| 2022/0022090 A1* | 1/2022 | Schliwa-Bertling | H04L 41/5025 |

(Continued)

FOREIGN PATENT DOCUMENTS

| EP | 3699885 A1 | 8/2020 |
| WO | 2008041893 A1 | 4/2008 |

OTHER PUBLICATIONS

"Radio Interface Implications of Network Slicing", In Proceedings of 3GPP Draft of TSR-RAN WG2, Oct. 10, 2016, 7 Pages.

(Continued)

*Primary Examiner* — Rushil Parimal Sampat

(57) ABSTRACT

In a 5G network, a slice controller is arranged to dynamically configure a radio access network (RAN) by allocating physical radio resources into RAN slices by making predictions of channel state information (CSI) for user equipment (UE) executing applications that make connectivity requests for admission to particular identified slices. The slice controller grants or denies admission requests based on the predicted CSI to ensure that applicable service level agreement (SLA) guarantees are satisfied for traffic across all the RAN slices. Each time new admission requests are received from applications, the slice controller determines whether a suitable RAN configuration exists that will enable SLA guarantees for the slices to continue to be satisfied for the current traffic while also meeting the SLA guarantees applicable to the new admission request.

15 Claims, 20 Drawing Sheets

(56) References Cited

U.S. PATENT DOCUMENTS

2022/0124547 A1\* 4/2022 Young ............... H04W 28/0247
2022/0377616 A1\* 11/2022 Ratnam ................ H04W 24/04

OTHER PUBLICATIONS

Ojijo, et al., "A Survey on Slice Admission Control Strategies and Optimization Schemes in 5G Network", In IEEE Access, vol. 8, Jan. 20, 2020, pp. 14977-14990.

"Invitation to Pay Additional Fees Issued in PCT Application No. PCT/US22/026610", dated Aug. 2, 2022, 13 Pages. (Ms# 409858-WO-PCT).

"International Search Repod and Written Opinion Issued in PCT Application No. PCT/US22/026610", dated Sep. 23, 2022, 19 Pages.

\* cited by examiner

300

5G ADMISSION BY VERIFYING SLICE SLA GUARANTEES

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near real-time management and control of critical business operations.

SUMMARY

In a 5G network, a slice controller is arranged to dynamically configure a radio access network (RAN) by allocating physical radio resources into RAN slices by making predictions of channel state information (CSI) for user equipment (UE) executing applications that make connectivity requests for admission to particular identified slices. The slice controller grants or denies admission requests based on the predicted CSI to ensure that applicable service level agreement (SLA) guarantees are satisfied for traffic across all the RAN slices. Each time new admission requests are received from applications, the slice controller determines whether a suitable RAN configuration exists that will enable SLA guarantees for the slices to continue to be satisfied for the current traffic while also meeting the SLA guarantees applicable to the new admission request. If a suitable RAN configuration is identified, then the application is admitted to the identified RAN slice. If a suitable RAN configuration cannot be identified, or be identified within a predefined time interval, then the admission request from the application is denied, or admission is granted (or negotiated) under different SLA terms.

In various illustrative embodiments, the slice controller may make the CSI predictions by using a model which may be updated using online channel information data or by using a model based on offline sources. In view of the CSI predictions, the network controller may control operations of the MAC (Medium Access Control) layer functions based on PHY (physical) layer subsets to allocate resources to the RAN slices in near-real time. The resource allocation may be performed continuously dynamically in response to changing traffic conditions to optimize the RAN configuration to meet the SLAs applicable to each slice. The allocation to the RAN slices includes subsets of physical radio resources taken from one or multiple blocks of numerologies describing physical transmission parameters that define the radio link.

Advantageously, the slice controller may operate in a 5G network to optimize application admission to RAN slices which improves the technical operations of the underlying physical infrastructure by efficiently managing the allocation of RAN resources among slices, dynamically in near-real-time, in response to ever-changing traffic patterns and resource demands. The inventive slice controller enables network operators and service providers to achieve reliable and performant connectivity between applications and services by admitting applications, based on the CSI predictions, when pre-defined technical performance objectives described in the SLAs a RAN slice can be expected to be met. Application admissions that would be expected to cause the RAN slice to fail to meet the applicable SLA guarantees are denied.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

Figure 1:
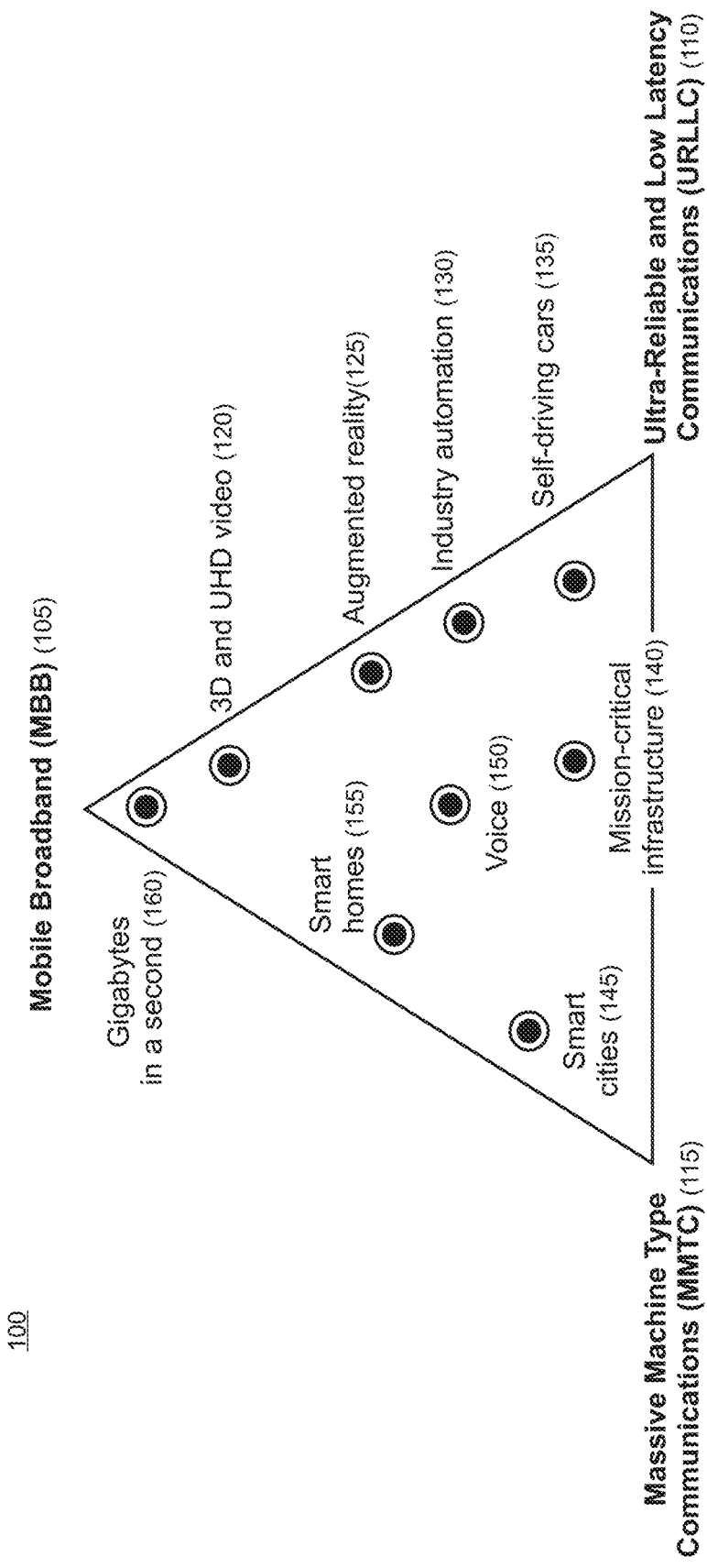
FIG. 1 shows illustrative 5G network usage scenario examples.

DETAILED DESCRIPTION 5G mobile networks utilize a service-based architecture that supports data connectivity and services enabling deployments using techniques such as, for example, Network Function Virtualization (NFV), Software Defined Networking (SDN), and cloud computing. Some exemplary features and concepts of 5G networking include separating User Plane (UP) functions from Control Plane (CP) functions allowing independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario examples 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or predefined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some predefined service level agreement (SLA). Each portion of the 5G network is respectively sliced such that the network can be viewed as being composed of RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
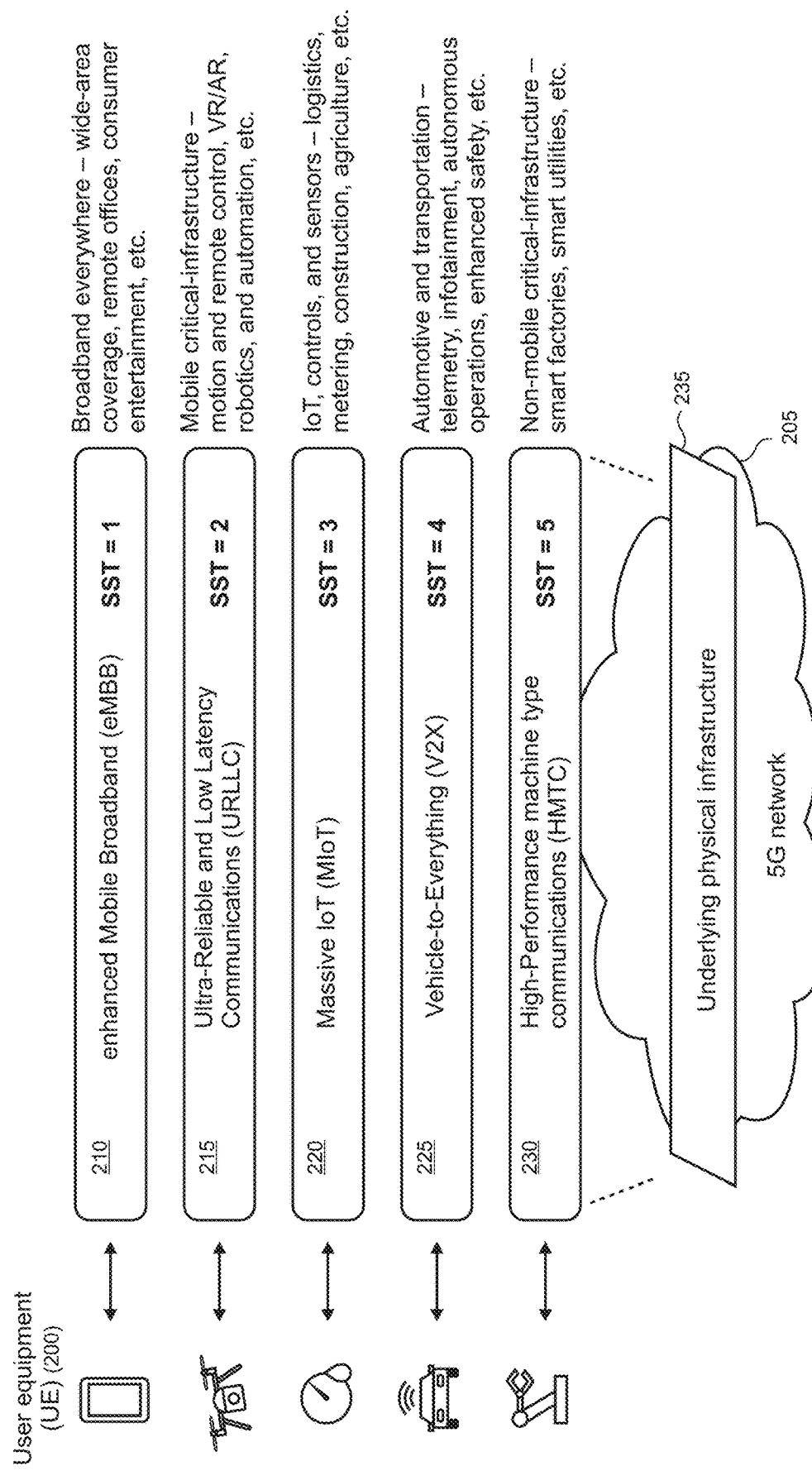
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. 3GPP also defines additional standardized SST values for V2X (Vehicle-to-Everything) (SST=4) and HMTC (High-Performance Machine Type Communications (SST=5). It may be appreciated that slice service types beyond those having standardized SST values can be defined.

The five standardized service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized slice may also be supported by other slices having other (i.e., non-standard) SST values.

FIG. 2 shows user equipment (UE) 200 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized networks speeds and data rates are desired and high traffic volumes are typically experienced. The URLLC slice 215 may be configured for mobile critical-infrastructure low-latency usage scenarios including applications such as remote control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
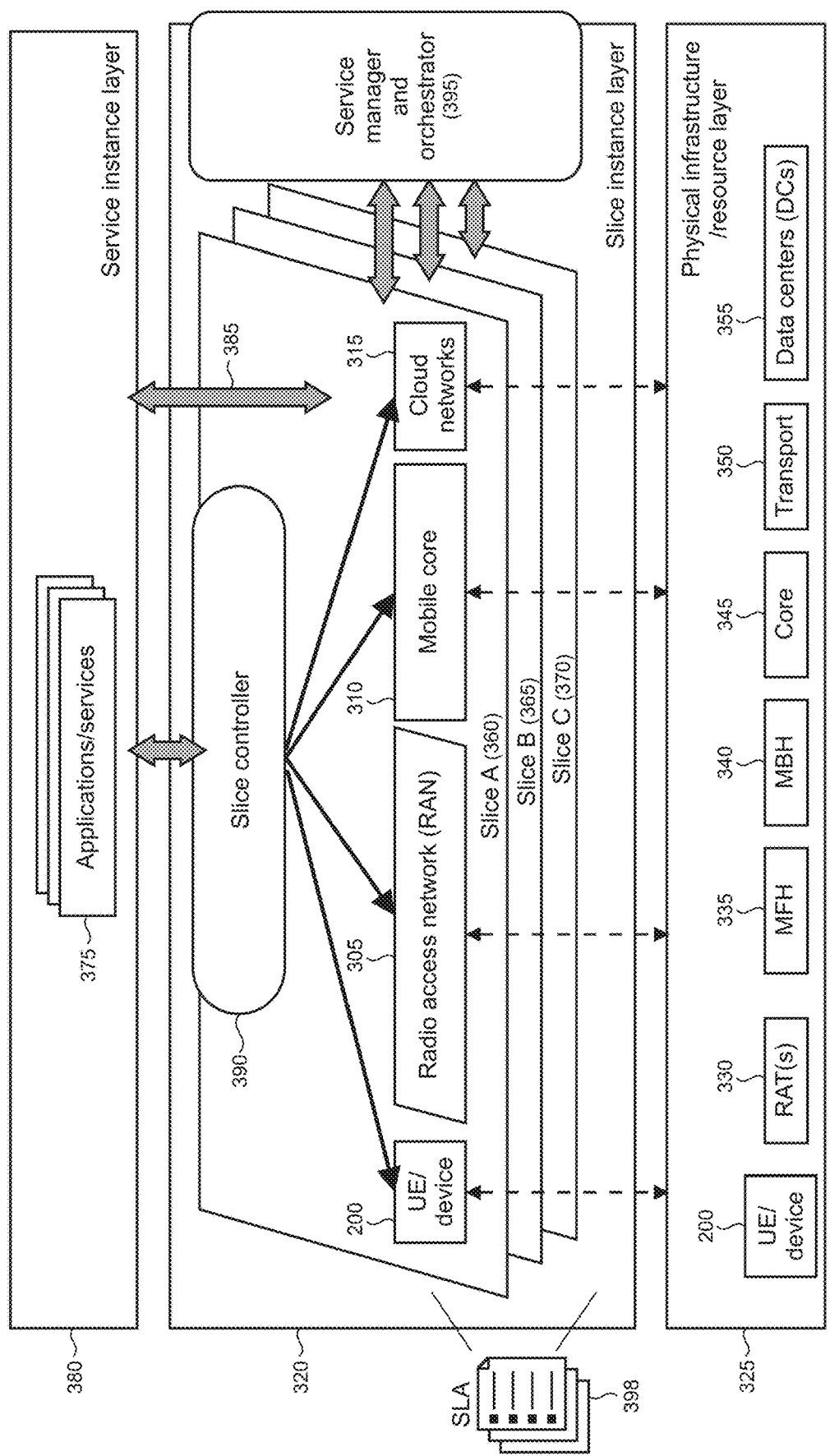
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the slice types shown in FIG. 2 and described in the accompanying text or comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet predefined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. A service manager and orchestrator 395 combines the necessary resources and functions to produce a network slice instance. Its main tasks include creation of slice instances upon the underlying physical infrastructure, dynamically mapping network functions to slice instances to meet changing context and maintaining communication between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet the connectivity requirements while ensuring compliance with applicable SLA guarantees, as discussed below in the text accompanying FIGS. 12 and 13.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present 5G admission methodologies, typically depending on applicable circumstances and context. For example, customers may include, but are not limited to consumers, businesses, enterprises, organizations, service providers, application developers, and the like. A 5G network operator may support its own services to customers as well as services from multiple different third party providers. For example, one third party provider may offer services to customers on one particular network slice while another third party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while eMBB resources may be readily scaled downward once the edge cloud buffering is complete.

Figure 4:
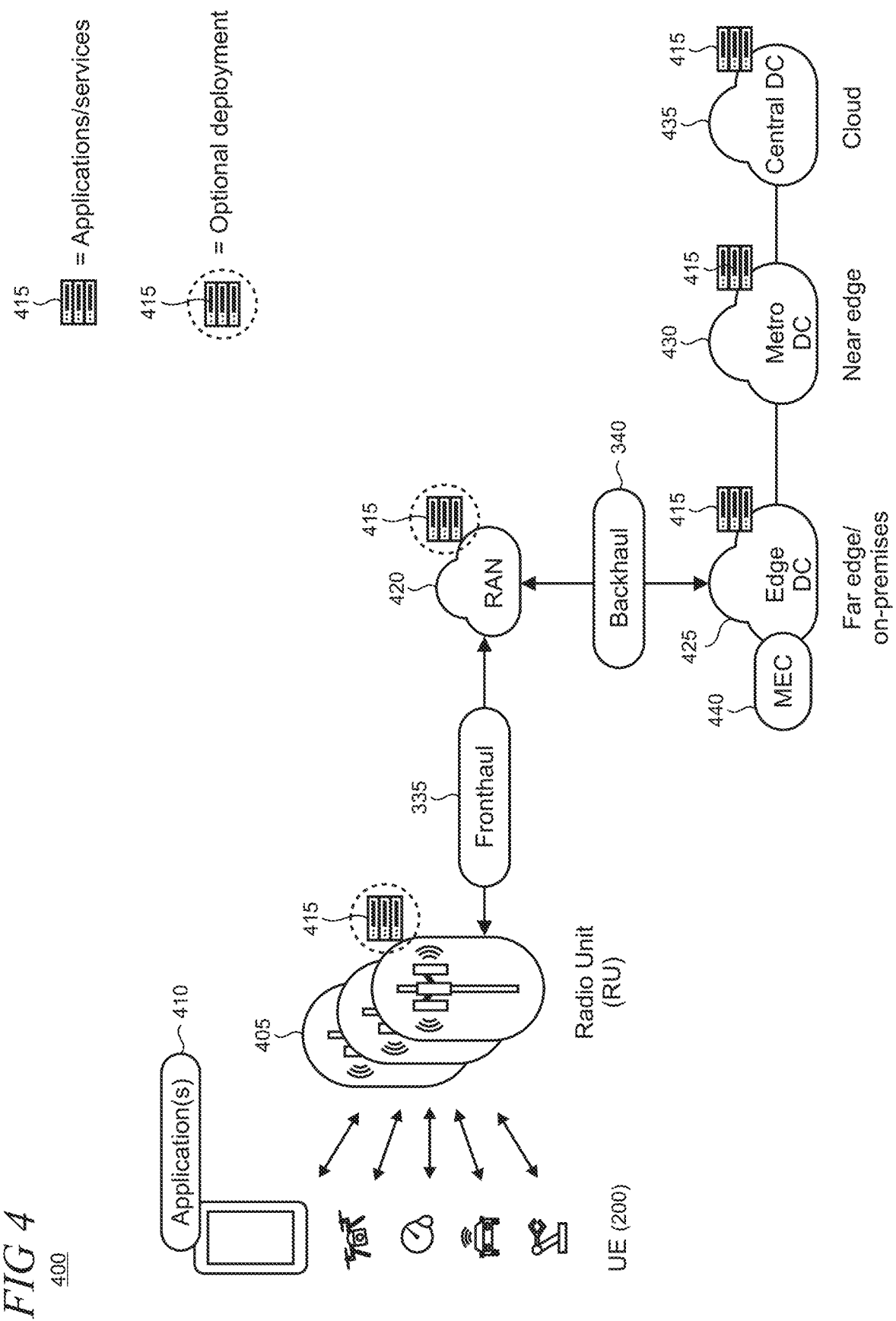
FIG. 4 shows illustrative physical infrastructure in a 5G network architecture.

FIG. 4 shows illustrative physical infrastructure in a 5G network architecture 400. Multiple instances of a radio unit (RU) 405 are configured to interact with a diverse population of UE 200. Each UE typically includes one or more local applications 410 or client-side software/firmware component that is arranged to interface with one or more remote application servers, service providers, or other resources (collectively indicated by reference numeral 415) and thus require network connectivity to such remote facilities.

The RUs are coupled by the mobile fronthaul 335 to a RAN 420. The RAN is coupled by the mobile backhaul 340 to one or more datacenters (DCs). In this illustrative example, the DCs comprise an edge DC 425, a metro DC 430, and a central DC 435. In some of networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 440.

The application servers 415 can be located at various points in the network architecture 400 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 420 or RU 405, as indicated by the dashed circles in FIG. 4.

Figure 5:
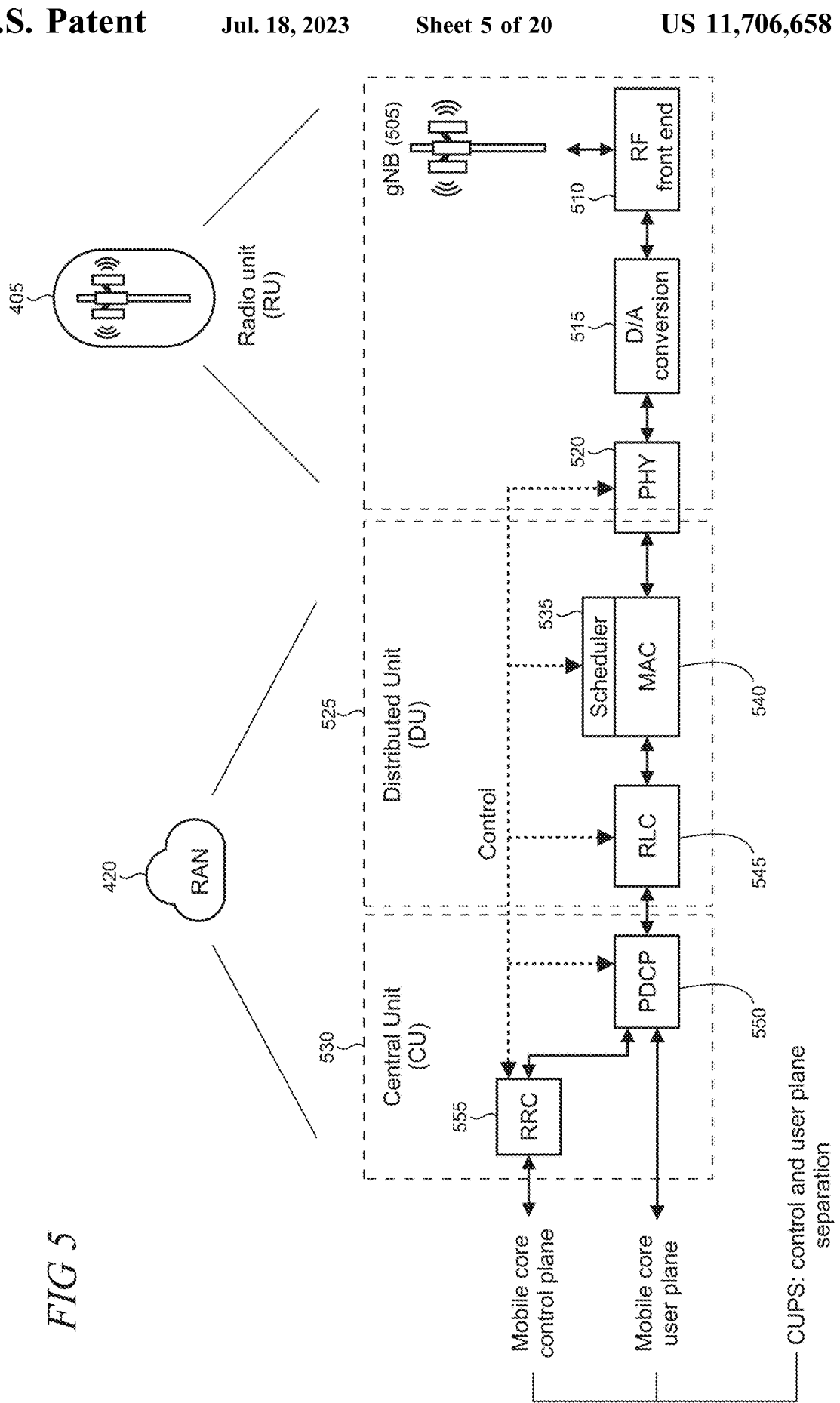
FIG. 5 shows an illustrative 5G radio access network (RAN) and radio unit (RU)

FIG. 5 shows functional blocks of the RAN 420 and RU 405. The RU comprises radio transmission points, for example, a next generation Node B, gNB 505, which handles radio communications with the UE. The gNB is serially coupled to a radio frequency (RF) front end 510, a digital to analog (D/A) conversion unit 515, and a portion of the functionality of the physical (PHY) layer 520 as described in the OSI Open Systems Interconnection model.

Under 3GPP and O-RAN (Open RAN) Alliance, the processing pipeline of the RAN 420 is split into a distributed unit (DU) 525, and a central unit (CU) 530. The DU is responsible for real-time layers 1 and 2 (L1 and L2) scheduling functions, and the CU is responsible for non-real-time, higher L2 and L3 functions. Accordingly, the DU comprises a scheduler 535 located on top of a MAC (Medium Access Control) layer component 540, an RLC (radio link control) layer component 545, and parts of a PHY (physical) layer component 520. The MAC layer component is responsible for buffering, multiplexing and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 530 is configured with a PDCP (Packet Data Convergence Protocol) layer component 550 and RRC (Radio Resource Control) layer component 555. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the mobile core control plane while the PDCP layer component interfaces with the user plane to thereby implement the "CUPS" feature of 5G (control and user plane separation).

Figure 6:
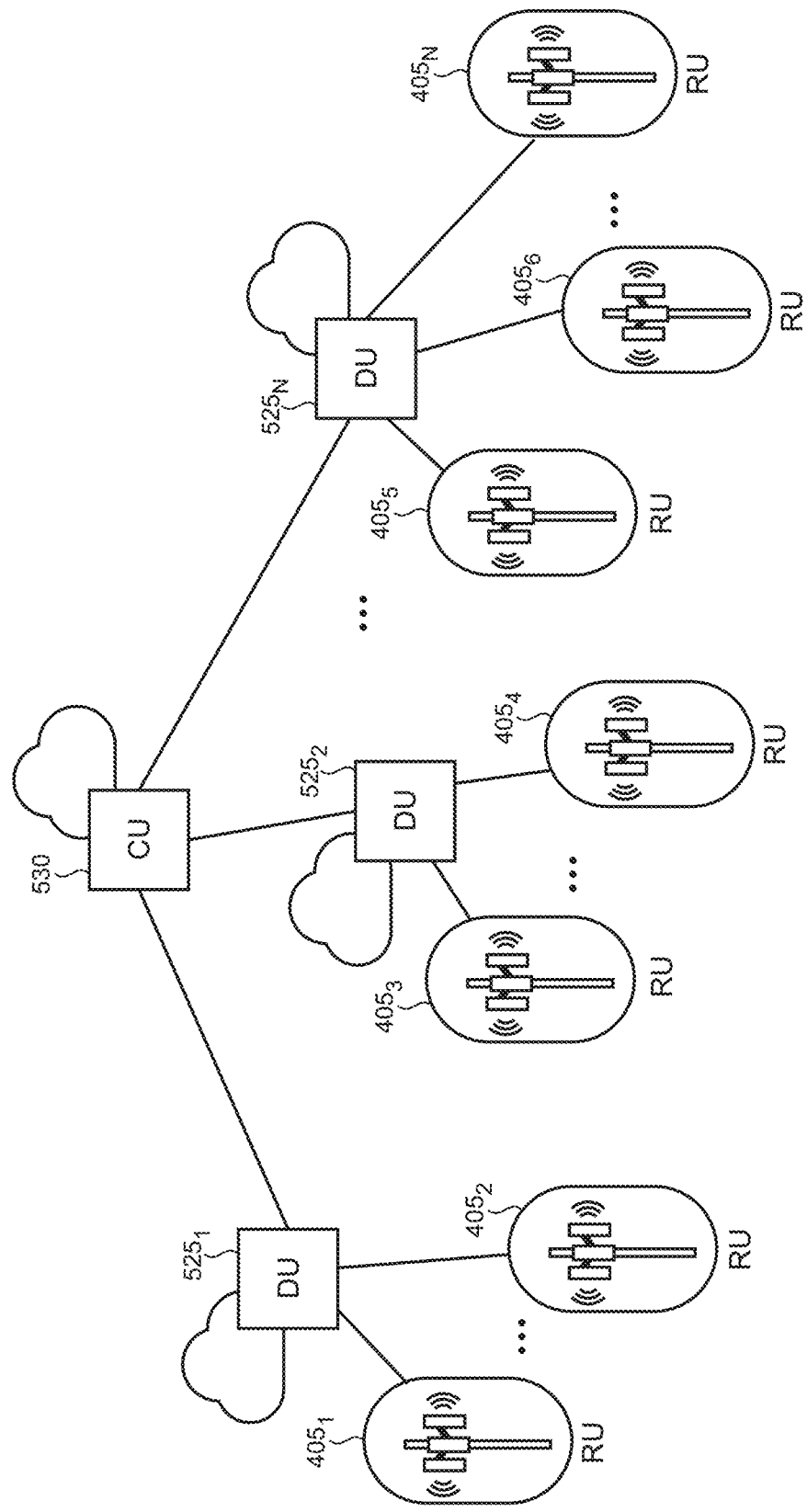
FIG. 6 shows an illustrative split-RAN hierarchy in which a central unit (CU) may support multiple distributed units (DUs) which, in turn, may support multiple RUs.

The split-RAN configuration shown in FIG. 5 enables RAN functionality to be split among physical infrastructure elements in centralized and distributed locations. For example, as shown in FIG. 6, a single CU 530 may be configured to serve multiple DUs 525, each of which in turn serves multiple RUs 405.

Figure 7:
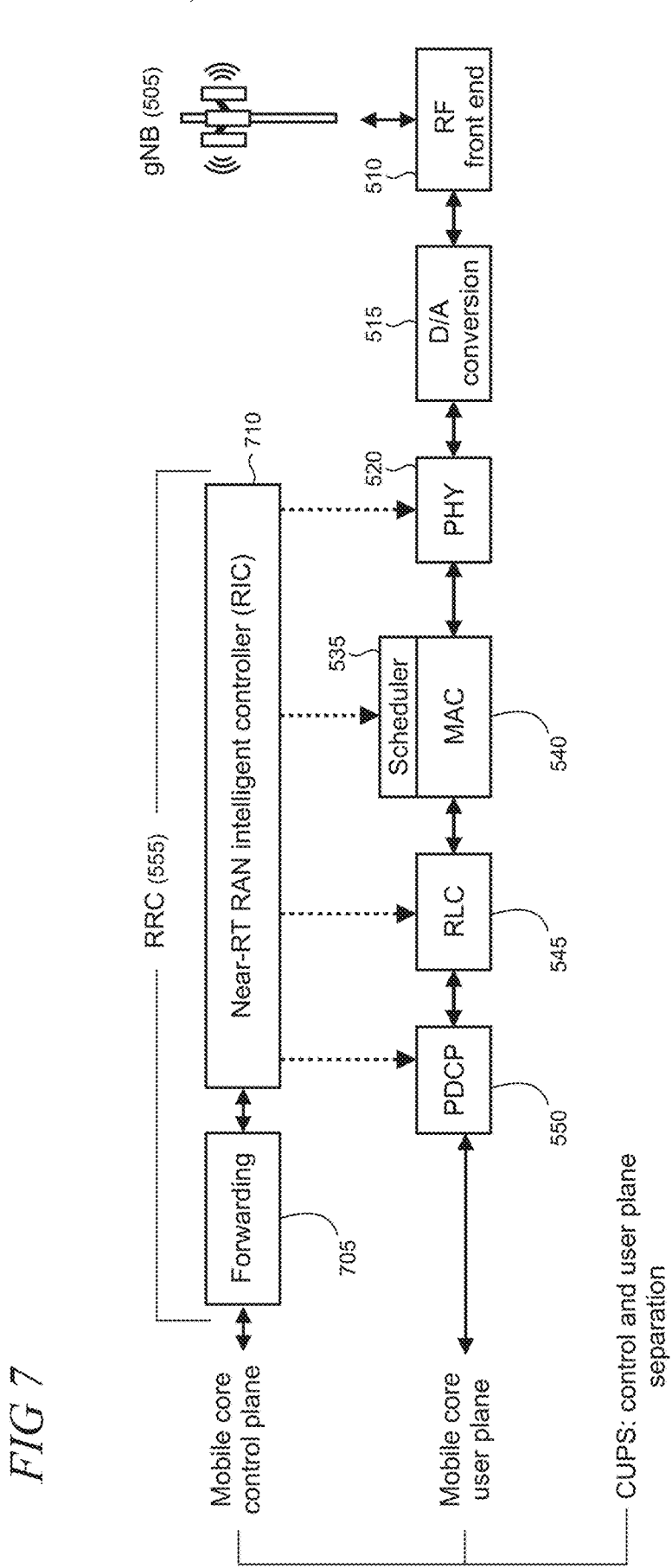
FIG. 7 shows an illustrative radio resource control (RRC) that is disaggregated into a mobile core-facing control plane component and a near-real-time RAN intelligent controller (near-RT MC)

FIG. 7 shows that the RRC layer component 555 may be disaggregated into a mobile core-facing control plane forwarding component 705 and a near-real-time (RT) controller RAN intelligent controller (MC) 710. The RRC layer component is thus responsible for only near-real-time configuration and control decision making, while the scheduler 535 on the MAC component 540 is responsible for real-time scheduling decisions.

Figure 8:
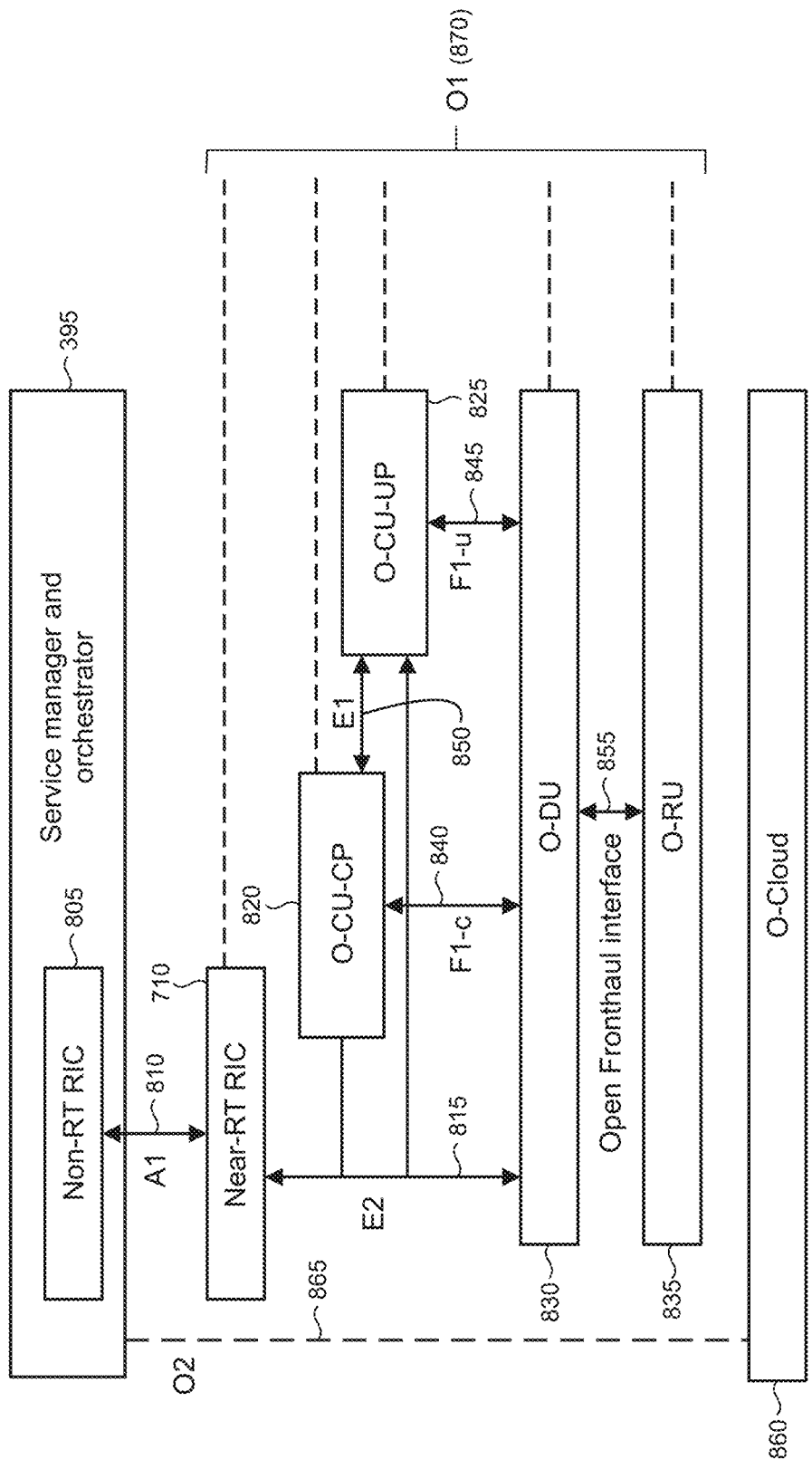
FIG. 8 shows an illustrative RAN operations and maintenance (OAM) logical architecture as described by the O-RAN Alliance.

FIG. 8 shows an illustrative RAN operations and maintenance (OAM) logical architecture 800, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 805 may be incorporated into the service manager and orchestrator 395. The non-RT RIC interoperates with a near-RT MC 710 through an A1 interface 810.

The near-RT MC 710 is coupled over an E2 interface 815 with network functions for radio access for control and optimization including the O-CU-CP (O-RAN Central Unit-Control Plane) 820, O-CU-UP (O-RAN Central Unit-User Plane) 825, and O-DU 830. The O-CU-CP and O-CU-UP are respectively coupled to the O-DU over F1-c and F1-u interfaces, 840 and 845, as defined and maintained by 3GPP. The O-CU-CP is coupled to the O-CU-UP over a 3GPP E1 interface 850. The O-DU and O-RU 835 are coupled using an Open Fronthaul interface 855 (also known as the lower layer split (LLS) interface).

The O-Cloud 860 is a cloud computing platform comprising a collection of physical infrastructure nodes that meet O-RAN requirements to host the relevant O-RAN functions (i.e., near-RT MC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 865. An O1 interface 870 is provided to each of the near-RT RIC, O-CU-CP, O-CU-UP, O-DU, and O-RU, as shown in FIG. 8.

Figure 9:
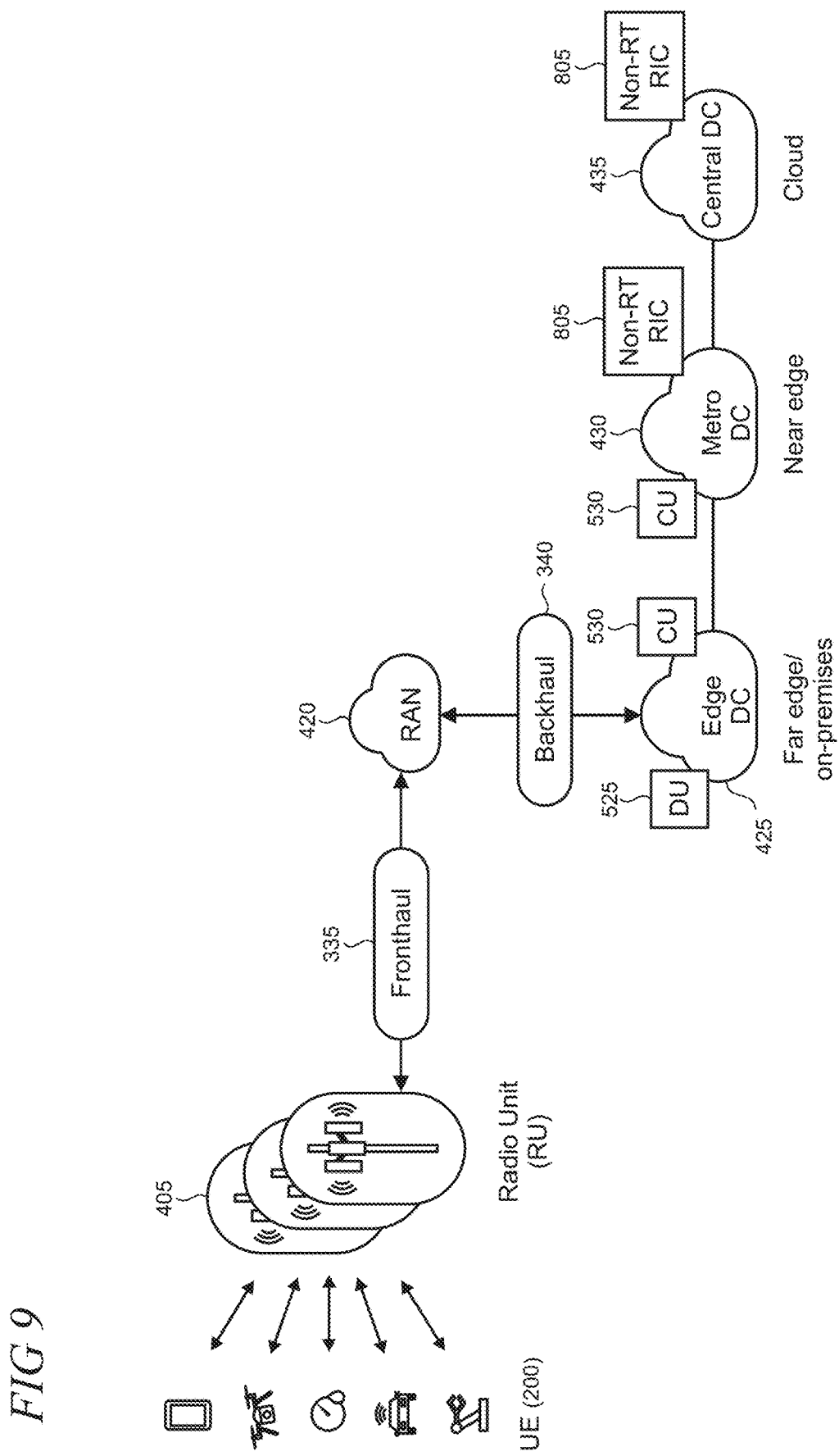
FIG. 9 shows an illustrative 5G implementation in which split-RAN functional units and instances of the non-real-time RIC (non-RT RIC) may be distributed among physical infrastructure components.

The splitting of functional elements among the DU, CU, near-RT MC, and non-RT MC, as discussed above, enables flexible deployment of instances of such elements in the physical infrastructure that underlies a typical 5G network. FIG. 9 shows an illustrative 5G implementation in which split-RAN functional units and instances of the non-real time MC may be distributed among physical infrastructure components. For example, as shown, a DU 525 and CU 530 may be located at the edge DC 425. A CU 530 and non-RT RIC 805 may be located in the metro DC 430. The central DC 435 can also host a non-RT RIC in some cases.

Figure 10:
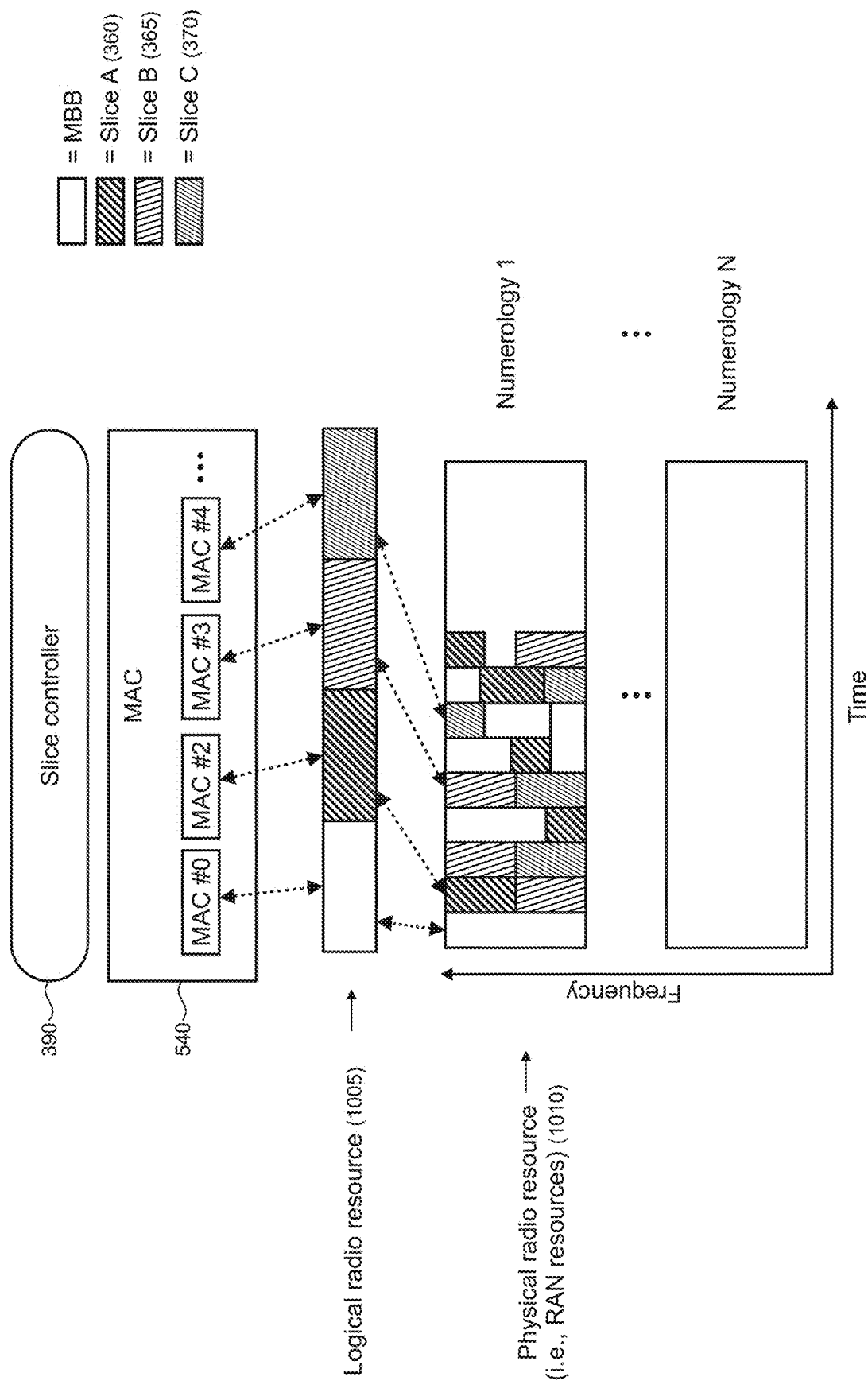
FIG. 10 shows an illustrative slice controller that may be configured to allocate physical radio resources among RAN slices.

FIG. 10 shows the slice controller 390 as illustratively configured to allocate physical radio resources among network slices. The slice controller may be instantiated, for example, as a component of the near-RT RIC 710 (FIG. 7) to thereby implement or combine the functionality of the scheduler 535 (FIG. 5). In alternative implementations, part of the slice controller may be distributed outside the near-RT MC, for example, in a CU in an edge or metro DC, or included in one or more other functional elements of the 5G network architecture. In some implementations, dynamically optimized RAN actions to ensure SLA guarantees may be performed in the near-RT RIC while longer term SLA assurance can be handled in the non-RT MC.

The slice controller 390 is arranged to control operations of the MAC component 540 based on logical representations 1005 of a radio resource in the PHY component 520 (FIG. 5). As shown, the MAC component 540 performs intra-slice resource allocation. More specifically, the physical radio resource 1010 is partitioned into multiple blocks or segments each defined by one numerology to meet certain communication requirements, such as low latency, wide coverage, etc. Numerology refers to the values of the basic physical transmission parameters, particularly including, for example, the transmission time slot length in which length of the slot is shorter for higher numerologies.

Each RAN portion of a network slice occupies a subset of physical resources taken from one or multiple numerology segments which may be represented, as shown in FIG. 10, using dimensions comprising frequency and time. In 5G, frame structures of the radio resources in the time domain are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each sub-frame. It may be appreciated that spatial multiplexing, referred to as MIMO (multiple input, multiple output), may also be utilized to provide additional layers of RAN resources that the slice controller may allocate in some implementations.

Figure 11:
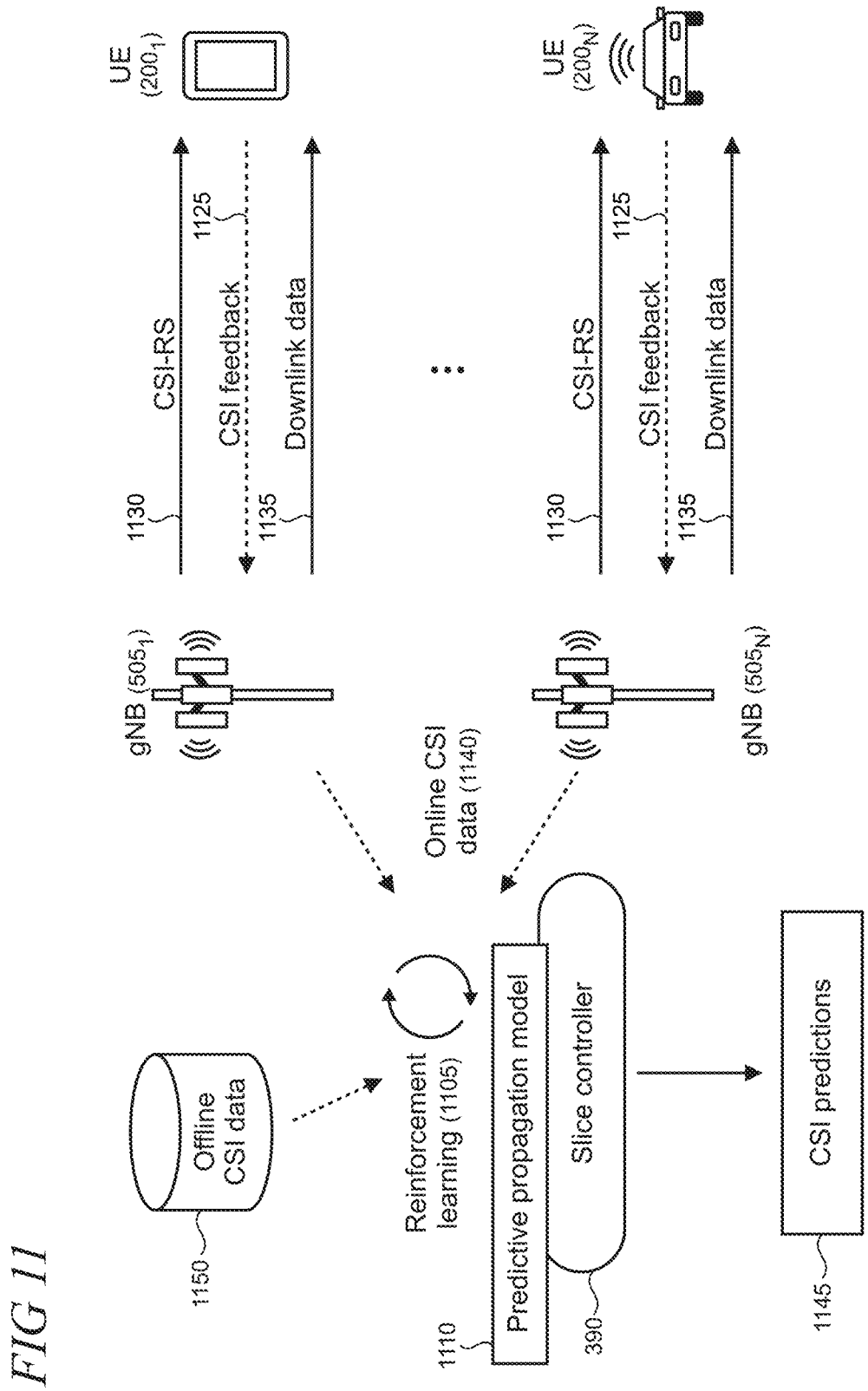
FIG. 11 shows online and offline CSI (channel state information) that is illustratively utilized by a slice controller to generate predicted CSI data using a predictive propagation model that utilizes reinforcement learning.

As illustratively shown in FIG. 11, the slice controller 390 may be configured to utilize channel state information (CSI) that it collects from online sources 1140 of channel information data to update a predictive propagation model 1110 that may implement reinforcement learning (indicated by reference numeral 1105). Alternatively, a predictive propagation model can be based on offline CSI data sources 1150. CSI parameters are the quantities related to the state of a 5G radio channel that are reported by the UE 200 to a gNB 505 as feedback 1125. The CSI feedback includes several parameters to report dynamic channel conditions between the UE and gNB, such as the CQI (channel quality indicator), the PMI (precoding matrix indicator) with different codebook sets, and the rank indicator (RI). The channel state information reference signal (CSI-RS) 1130 is used to measure the CSI feedback.

The CSI-RS is transmitted by the gNB as a known reference signal which the UE measures and then reports the radio channel properties back to the gNB. Channel conditions are typically reasonably stable with completely stationary UE. With limited changes in multipath propagation, most channel variations should come from interference from other cells or UE. However, mobile UE may experience vastly different and rapidly changing radio conditions, especially as they may move in and out of line of sight to the gNB. When the gNB receives the CSI parameters from the UE, it can schedule the downlink data transmissions 1135 (such as modulation scheme, code rate, number of transmission layers, and MIMO precoding) accordingly.

The CSI data can be collected online at the slice controller 390 as near-real-time data 1140, for example from the O-DU 830 (FIG. 8) over the E2 interface 815 and used in the predictive propagation model 1110 to generate CSI predictions 1145. These predictions are utilized by the slice controller to determine RAN admission in response to an admission request from an application/UE, as discussed below. Alternatively, a predictive propagation model can be based on CSI data from offline sources 1150. It may be appreciated that various combinations of online and/or offline CSI data, learning methods, algorithms, and/or predictive models may be utilized to make CSI predictions to meet the needs of particular implementations of 5G network admission. In addition, machine learning and/or artificial intelligence may also be utilized for the CSI predictions in some implementations.

Figure 12:
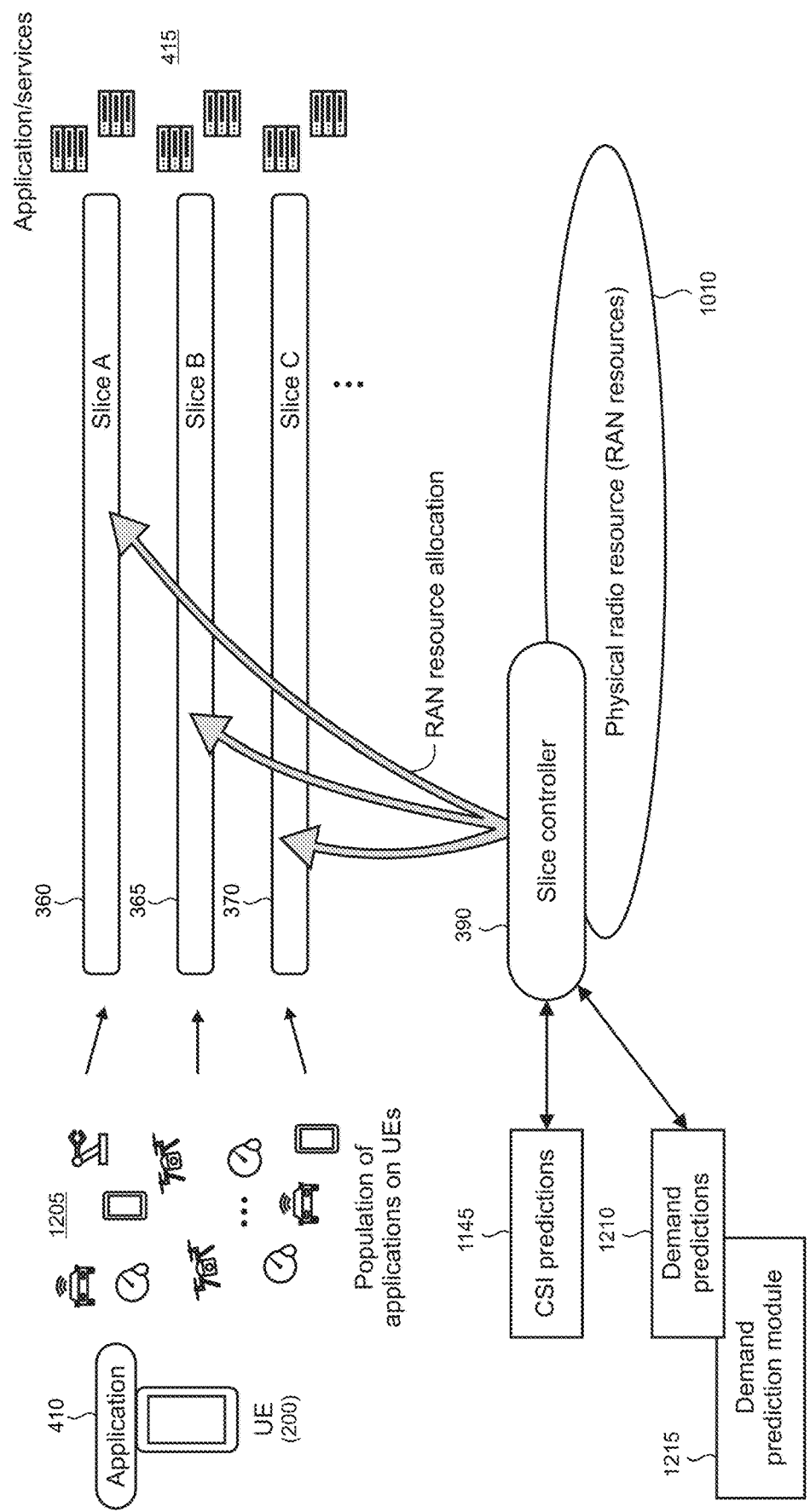
FIG. 12 shows an illustrative slice controller allocating RAN resources among RAN portions of slices while maintaining SLA (service level agreement) guarantees for the slices as they handle traffic from a population of applications that are running on various user equipment (UE)

FIG. 12 shows the slice controller 390 allocating RAN resources 1010 among RAN portions of slices while maintaining SLA guarantees for the slices A, B, and C as they handle traffic from a population 1205 of applications that are running on various UE. An application 410 on a UE 200 may make a new request for connectivity to a slice. The request can be associated with a UE that is currently engaged in a communication session over a slice or be associated with a new session. It is noted that the request may be appropriately considered as originating from the application, from the UE that is hosting the application, or from both, depending on applicable context. For example, a single UE may maintain up to eight multiple network slices simultaneously (e.g., for different applications that execute on the UE), but typically only one signaling connection to the network is maintained.

The slice controller 390 will dynamically allocate RAN resources among the RAN portions of slices A, B, and C to create a RAN configuration to satisfy SLA requirements for any slice that is associated with the new request. The slice controller may perform such dynamic allocation in response to the application request for admission in view of the CSI predictions 1145. The slice controller can also utilize predictions of traffic demands 1210, in combination with the CSI predictions, to perform the resource allocation in some implementations of the present invention and determining application admissions. The demand predictions are generated by a demand prediction module 1215 that may be implemented as a standalone component in some cases or be incorporated into the slice controller (and/or into other components of the near-RT RIC) in other cases. The demand predictions comprise estimates of the amount of traffic that is expected from UE for a given slice. While demand may be assumed to be equal to traffic levels specified by the applicable SLAs, the prediction module will maintain a history of actual demand per application, user, UE, and/or slice that is used to generate the demand predictions to thereby provide further criteria to the RAN resource scheduling and application admission decision making by the slice controller.

Figure 13:
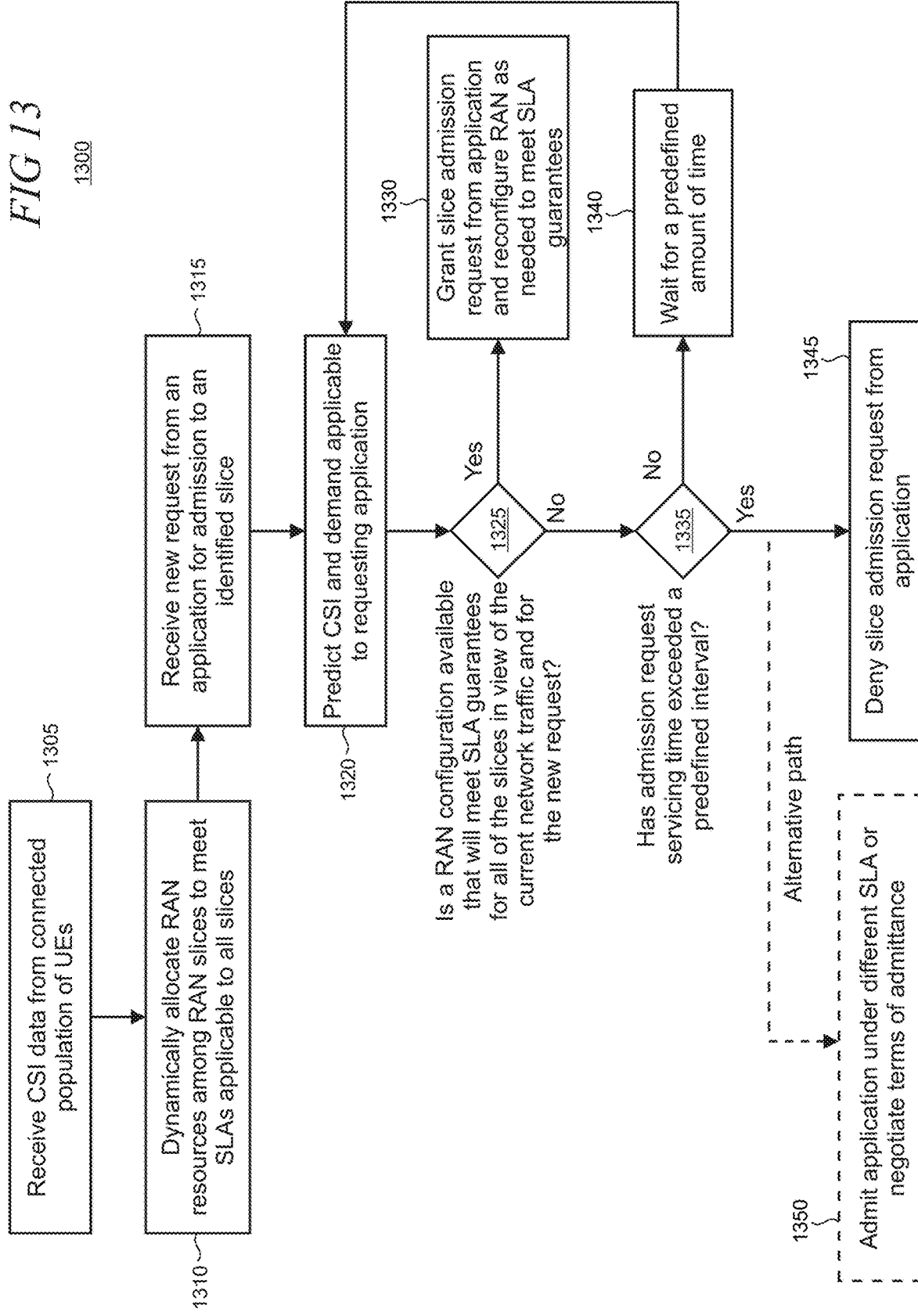
FIG. 13 is a flowchart of an illustrative method by which a slice controller can permit or deny admittance of an application or UE to a RAN slice based on SLA guarantees.

A flowchart 1300 of an illustrative admission process is shown in FIG. 13. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1305 in the flowchart, the slice controller 390 (FIG. 3) receives CSI data from a population of UEs that are currently engaged in 5G networking sessions as a logical connection to the network. The UEs may be maintaining connectivity across the network slices that are associated with the controller, for example slices A, B, and C shown in FIG. 3. The slice controller has knowledge of the SLAs that are applicable to the slices and connected applications operating among the UE population. At block 1310, the slice controller continuously and dynamically allocates RAN resources to the RAN portions of the slices as appropriate to meet SLA guarantees across the slices for the ongoing sessions.

At block 1315, a new request is received from an application for admission to an identified slice. Under 3GPP TS 23.501, each network slice type is uniquely identified by an NSSAI or one or more S-NSSAI (single NSSAI) in cases where an optional SD may also be utilized. Using the predictive propagation model 1110 (FIG. 11), the slice controller 390 can predict the CSI for the UE that supports the admission-requesting application at block 1320. A prediction of traffic demand may also be made by the demand prediction module 1155 (FIG. 11) with regard to the application and/or UE on which the application is executing for a given slice.

At decision block 1325, a determination is made by the slice controller using the CSI and demand predictions as to whether a RAN configuration is available that will meet SLA guarantees for all of the network slices in view of the current network traffic and for the new request. Typically, conformance with SLA guarantees is determined on a statistical basis by collecting relevant data and performance metrics over a given time period.

If the slice controller identifies such a RAN configuration exists, then control passes to block 1330 and the slice controller grants admission to the application to the identified slice. The slice controller will reconfigure the RAN by allocating resources as appropriate in view of the new admission to meet all the applicable SLA guarantees for all the slices in view of the current traffic to some desired degree of statistical confidence. Accordingly, network performance may be measured against the applicable SLA guarantees using statistical metrics or indicators, such as percentile, rate, or mean, that are aggregated over a measurement window. The timeframes over which SLAs are statistically guaranteed are typically agreed upon in advance between the service provider and the end-users/applications to which a given SLA is applicable.

If no RAN configuration currently exists that will meet SLA guarantees, then control passes to decision block 1335, where it is determined whether some predefined admission request servicing time interval has been exceeded. If not, then control passes to block 1340 and the admission process waits for some predefined amount of time. After waiting, control is passed back to block 1320 where a new CSI prediction may be made in view of then-current network conditions and another determination of availability of a suitable RAN configuration is performed at decision block 1325. The recursion can be continued until the admission request can be accommodated or the process times out.

If the predefined admission request servicing time interval is exceeded (i.e., times out), then control passes to block 1345 and the application admission request is denied. Alternatively, flow control can pass to block 1350 where the application can be admitted to the identified slice or terms for admittance can be negotiated. For example, the admission request can be fulfilled under terms of a different SLA (which may imply admission to a different slice), or the admission request can be fulfilled to the identified slice, but SLA guarantees are waived or modified (e.g., "best effort").

Figure 14:
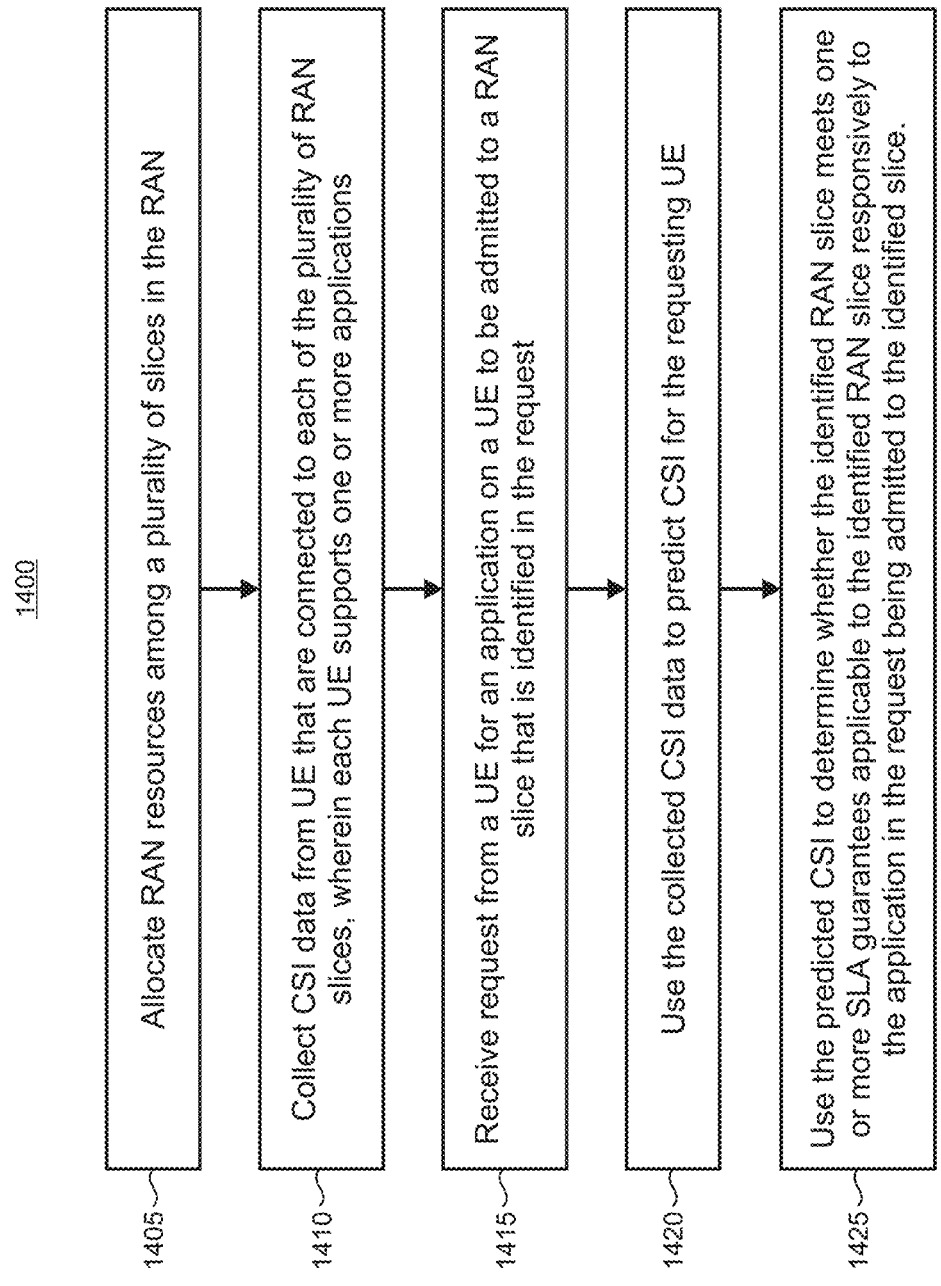
FIGS. 14, 15, and 16 show illustrative methods that may be performed when implementing the present 5G admission by verifying slice SLA guarantees.

FIG. 14 is a flowchart of an illustrative method 1400 that may be performed in a 5G network. At block 1405, the slice controller allocates RAN resources among a plurality of slices in the RAN. At block 1410, CSI data is collected from UE that are connected to each of the plurality of RAN slices in which each UE supports one or more applications. At block 1415, a request is received from a UE for an application on a UE to be admitted to a RAN slice that is identified in the request.

At block 1420, the slice controller 390 uses the collected CSI data to predict CSI for the requesting UE. At block 1425, the predicted CSI is used to determine whether the identified RAN slice meets one or more SLA guarantees applicable to the identified RAN slice responsively to the application in the request being admitted to the identified slice.

Figure 15:
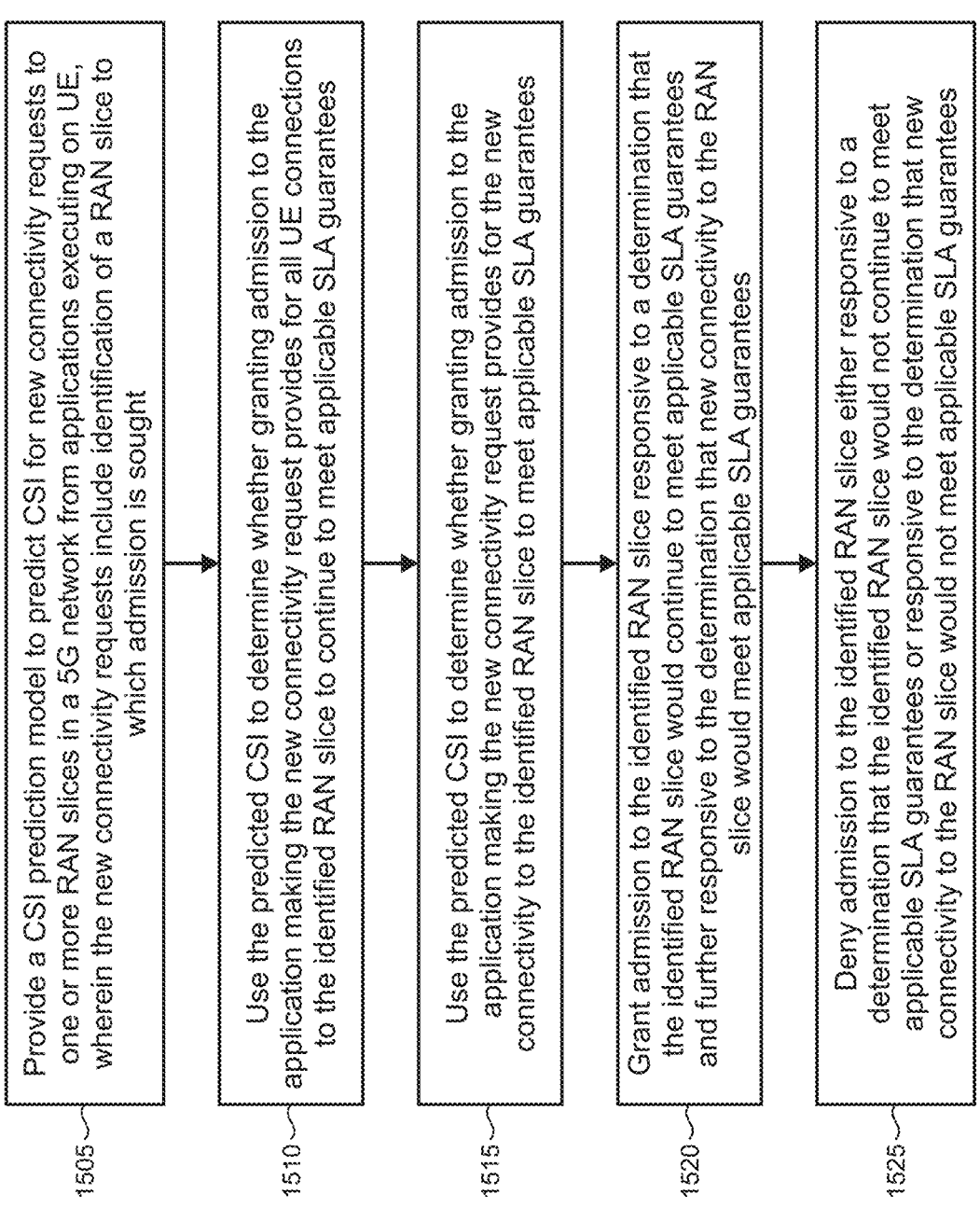

FIG. 15 is a flowchart of another illustrative method 1500 that may be performed in a 5G network. At block 1505, a channel state information (CSI) prediction model is provided to predict CSI for new connectivity requests to one or more RAN slices in a 5G network from applications executing on UE, in which the new connectivity requests include identification of a RAN slice to which admission is sought. At block 1510, the slice controller uses the predicted CSI to determine whether granting admission to the application making the new connectivity request provides for all UE connections to the identified RAN slice to continue to meet applicable SLA guarantees.

At block 1515, the slice controller uses the predicted CSI to determine whether granting admission to the application making the new connectivity request provides for the new connectivity to the identified RAN slice to meet applicable SLA guarantees. At block 1520, admission to the identified RAN slice is granted responsive to a determination that the identified RAN slice would continue to meet applicable SLA guarantees and further responsive to the determination that new connectivity to the RAN slice would meet applicable SLA guarantees. At block 1525, admission to the identified RAN slice is denied either responsive to a determination that the identified RAN slice would not continue to meet applicable SLA guarantees or responsive to the determination that new connectivity to the RAN slice would not meet applicable SLA guarantees.

Figure 16:
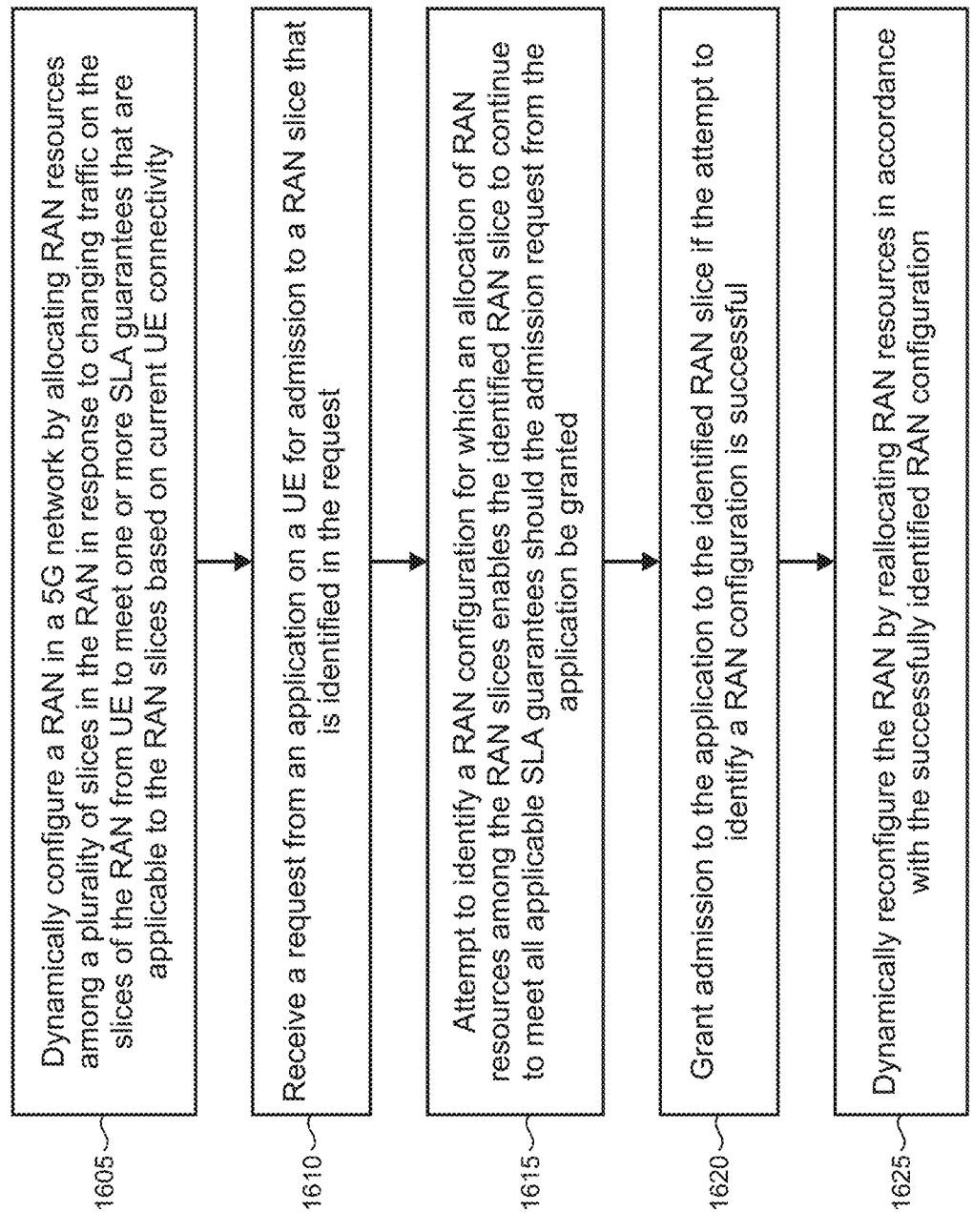

FIG. 16 is a flowchart of another illustrative method 1600 that may be performed in a 5G network. At block 1605, the slice controller dynamically configures a RAN in a 5G network by allocating RAN resources among a plurality of slices in the RAN in response to changing traffic on the slices of the RAN from UE to meet one or more SLA guarantees that are applicable to current UE connectivity to the RAN slices. At block 1610, a request is received from an application on a UE for admission to a RAN slice that is identified in the request.

At block 1615, the slice controller attempts to identify a RAN configuration for which an allocation of RAN resources among the RAN slices enables the identified RAN slice to continue to meet all applicable SLA guarantees should the admission request from the application be granted. At block 1620, the slice controller grants admission to the application to the identified RAN slice if the attempt to identify a RAN configuration is successful. At block 1625, the slice controller dynamically reconfigures the RAN by reallocating RAN resources in accordance with the successfully identified RAN configuration.

Figure 17:
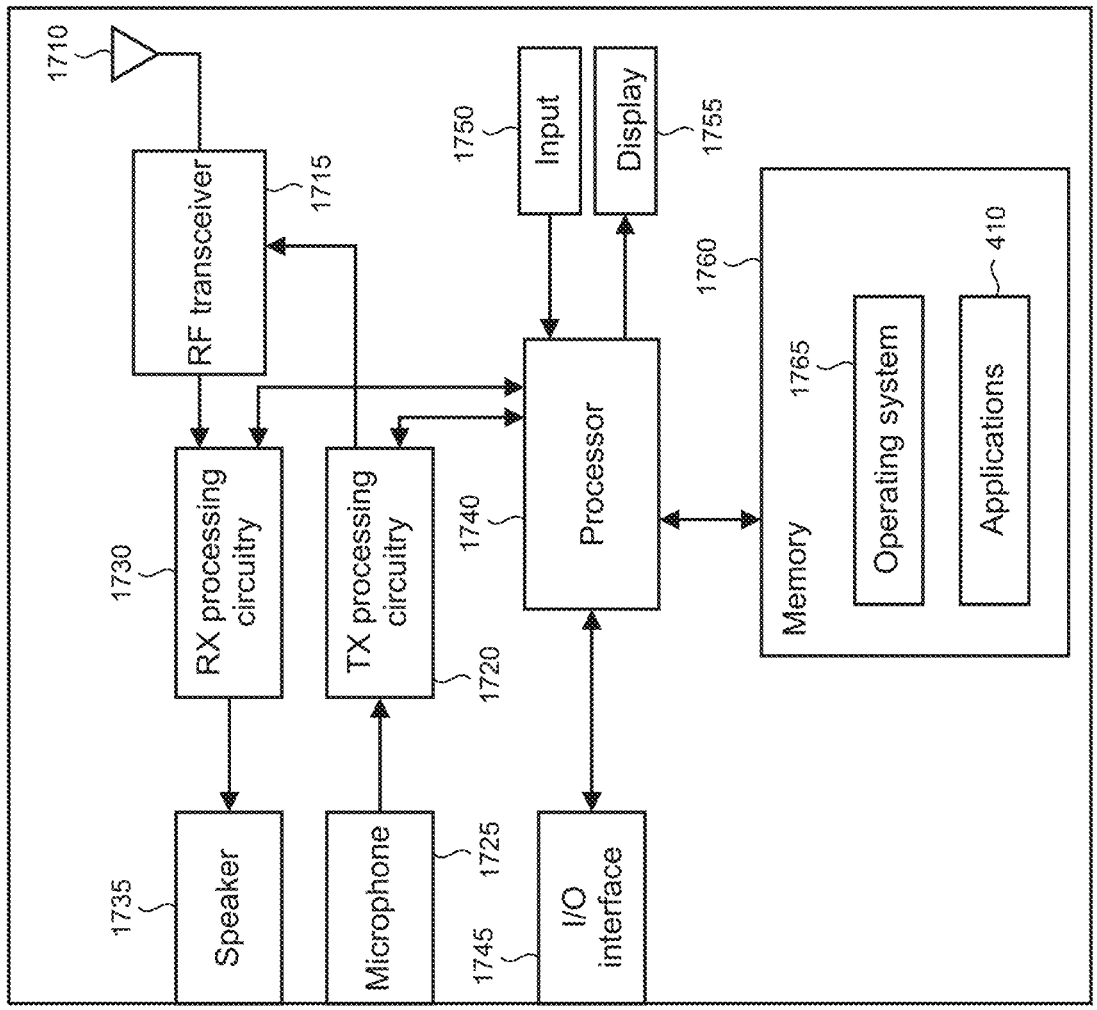
FIG. 17 is a block diagram of an illustrative UE that may be used at least in part to implement the present 5G admission by verifying slice SLA guarantees.

FIG. 17 is a block diagram of an illustrative UE 200 that may be used at least in part to implement the present 5G admission by verifying slice SLA guarantees. The embodiment of the UE 200 shown in FIG. 17 is for illustration only, and the UEs 200 shown in the drawings and described in the preceding text may have the same or similar configuration. However, it is noted that UEs may come in a wide variety of configurations, and FIG. 17 does not limit the scope of the present disclosure to any particular implementation of a UE.

The UE 200 includes an antenna 1710, a radio frequency (RF) transceiver 1715, transmit (TX) processing circuitry 1720, a microphone 1725, and receive (RX) processing circuitry 1730. The UE 200 also includes a speaker 1735, a processor 1740, an input/output (I/O) interface 1745, an input device 1750, a display 1755, and a memory 1760. The memory includes an operating system (OS) program 1765 and one or more applications 410.

The RF transceiver 1715 receives from the antenna 1710, an incoming RF signal transmitted by a gNB of a 5G network 400 (FIG. 4). The RF transceiver down-converts the incoming RF signal to generate an intermediate frequency (IF) or baseband signal. The IF or baseband signal is sent to the RX processing circuitry 1730, which generates a processed baseband signal by filtering, decoding, and/or digitizing the baseband or IF signal. The RX processing circuitry transmits the processed baseband signal to the speaker 1735 (such as for voice data) or to the processor 1740 for further processing (such as for web browsing data).

The TX processing circuitry 1720 receives analog or digital voice data from the microphone 1725 or other outgoing baseband data (such as web data, e-mail, or interactive video game data) from the processor 1740. The TX processing circuitry 1720 encodes, multiplexes, and/or digitizes the outgoing baseband data to generate a processed baseband or IF signal. The RF transceiver 1715 receives the outgoing processed baseband or IF signal from the TX processing circuitry and up-converts the baseband or IF signal to an RF signal that is transmitted via the antenna.

The processor 1740 can include one or more processors or other processing devices and execute the OS program 1765 stored in the memory 1760 to control the overall operation of the UE 200. For example, the processor may control the reception of forward channel signals and the transmission of reverse channel signals by the RF transceiver 1715, the RX processing circuitry 1730, and the TX processing circuitry 1720 in accordance with well-known principles. In some embodiments, the processor 1740 includes at least one microprocessor or microcontroller.

The processor 1740 may be configured for executing other processes and programs resident in the memory 1760, such as operations for CSI measurement and reporting for systems described in embodiments of the present disclosure. The processor can move data into or out of the memory as required by an executing process. In some embodiments, the processor may be configured to execute the applications 405 based on the OS program 1765 or in response to signals received from gNBs or an operator. The processor is also coupled to the I/O interface 1745, which provides the UE 200 with the ability to connect to other computing devices such as laptop computers and handheld computers. The I/O interface may thus function as a communication path between such accessories and the processor.

The processor 1740 is also coupled to the input device 1750 (e.g., keypad, touchscreen, buttons etc.) and the display 1755. A user of the UE 200 can typically employ the input device to enter data into the UE. For example, the display can be a liquid crystal display or other display capable of rendering text and/or graphics, video, etc., from web sites, applications and/or service providers.

The memory 1760 is coupled to the processor 1740. Part of the memory may include a random access memory (RAM), and another part of the memory may include a Flash memory or other read-only memory (ROM).

As described in more detail below, the UE 200 can perform signaling and calculation for CSI reporting. Although FIG. 17 shows one illustrative example of UE 200, it may be appreciated that various changes may be made to the drawing. For example, various components may be combined, further subdivided, or omitted and additional components may be added according to particular needs. As a particular example, the processor 1740 may be divided into multiple processors, such as one or more central processing units (CPUs) and one or more graphics processing units (GPUs). Also, while FIG. 17 depicts the UE 200 as configured as a mobile device, such as a smartphone, UEs may be configured to operate as other types of portable or stationary devices.

Figure 18:
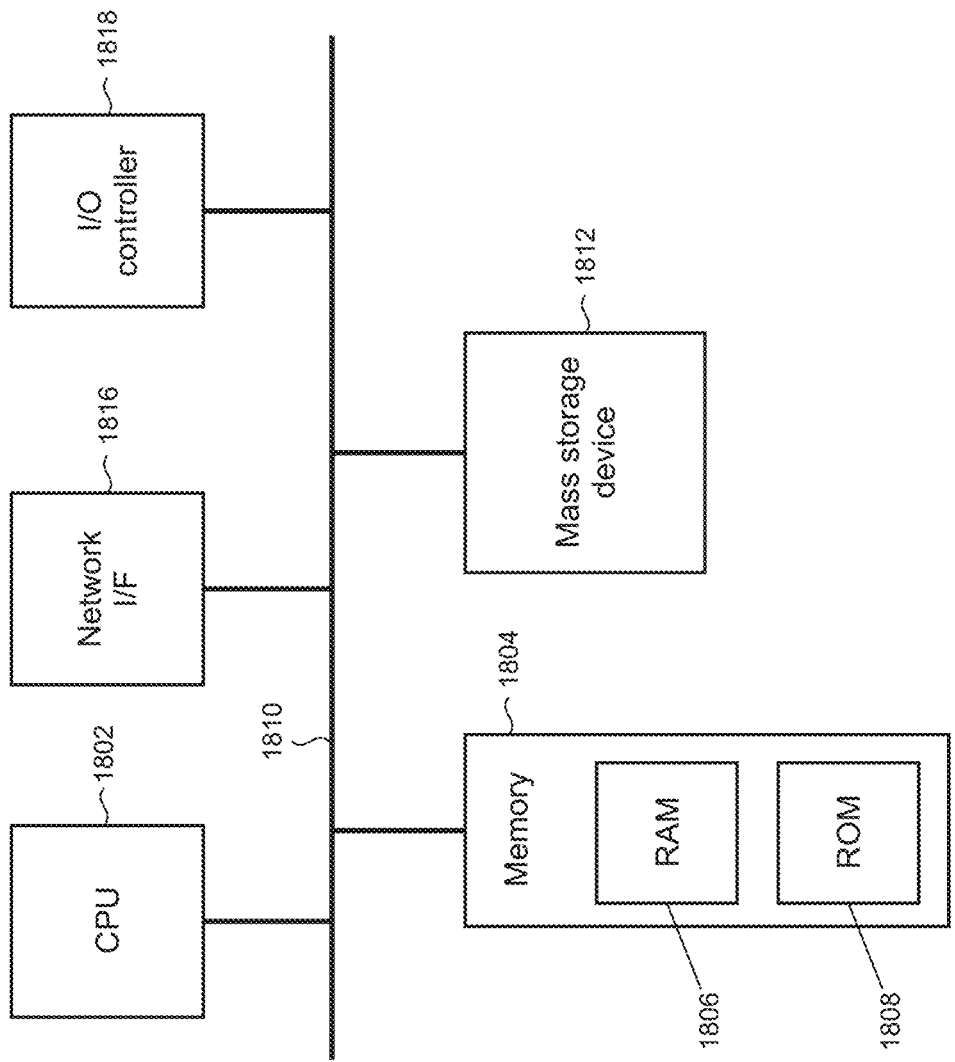
FIG. 18 is a block diagram of an illustrative server or computing device that may be used at least in part to implement the present 5G admission by verifying slice SLA guarantees.

FIG. 18 shows an illustrative architecture 1800 for a computing device, such as a server, capable of executing the various components described herein for 5G admission by verifying slice SLA guarantees. The architecture 1800 illustrated in FIG. 18 includes one or more processors 1802 (e.g., central processing unit, dedicated AI chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
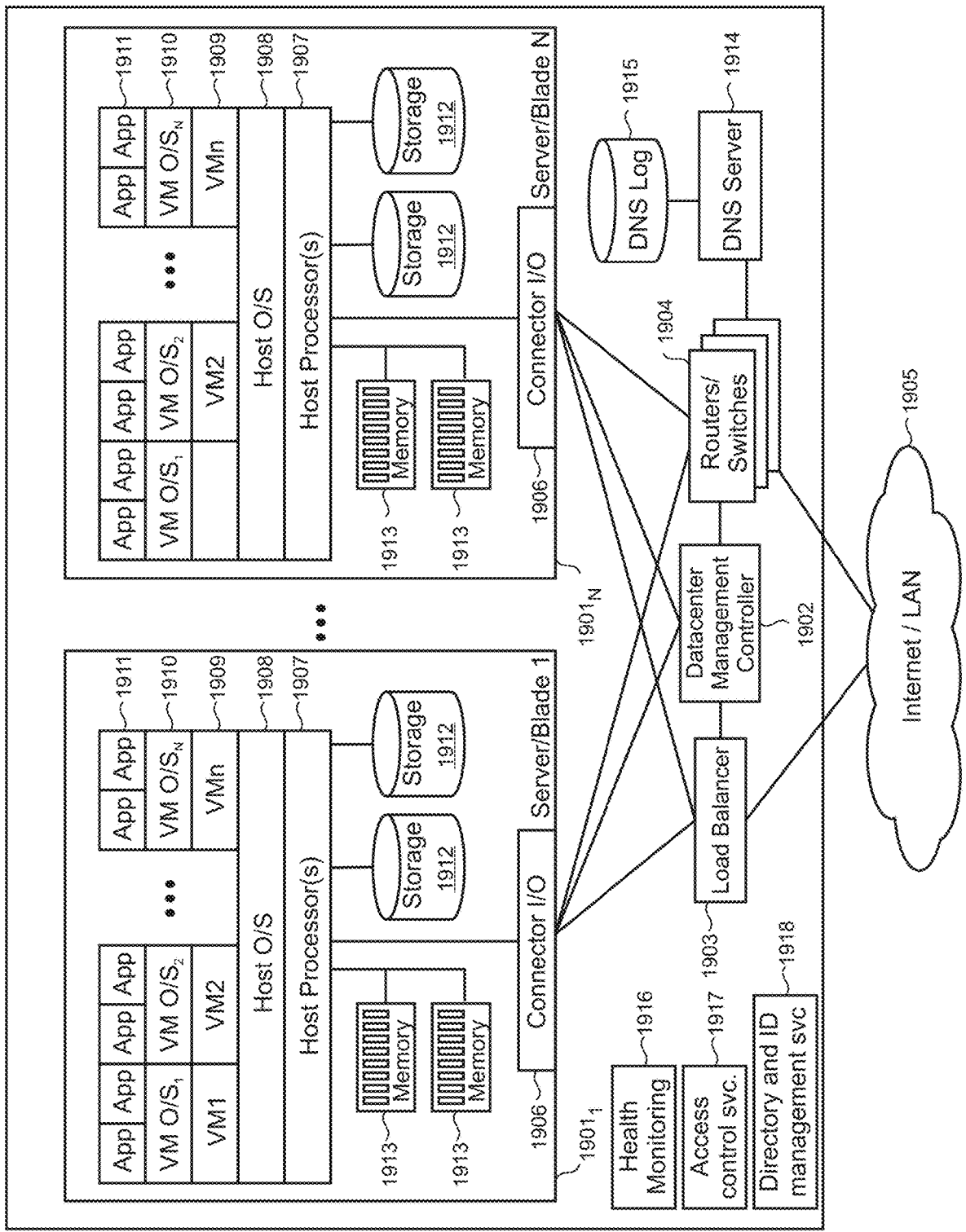
FIG. 19 is a block diagram of an illustrative datacenter that may be used at least in part to implement the present 5G admission by verifying slice SLA guarantees.

FIG. 19 is a high-level block diagram of an illustrative datacenter 1900 that provides cloud computing services or distributed computing services that may be used to implement the present 5G admission by verifying slice SLA guarantees. Datacenter 1900 may incorporate the features disclosed in FIGS. 1-10. A plurality of servers 1901 are managed by datacenter management controller 1902. Load balancer 1903 distributes requests and computing workloads over servers 1901 to avoid a situation wherein a single server may become overwhelmed. Load balancer 1903 maximizes available capacity and performance of the resources in datacenter 1900. Routers/switches 1904 support data traffic between servers 1901 and between datacenter 1900 and external resources and users (not shown) via an external network 1905, which may be, for example, a local area network (LAN) or the Internet.

Servers 1901 may be standalone computing devices, and/or they may be configured as individual blades in a rack of one or more server devices. Servers 1901 have an input/output (I/O) connector 1906 that manages communication with other database entities. One or more host processors 1907 on each server 1901 run a host operating system (O/S) 1908 that supports multiple virtual machines (VM) 1909. Each VM 1909 may run its own O/S so that each VM O/S 1910 on a server is different, or the same, or a mix of both. The VM O/Ss 1910 may be, for example, different versions of the same O/S (e.g., different VMs running different current and legacy versions of the Windows® operating system). In addition, or alternatively, the VM O/Ss 1910 may be provided by different manufacturers (e.g., some VMs running the Windows® operating system, while other VMs are running the Linux® operating system). Each VM 1909 may also run one or more applications (App) 1911. Each server 1901 also includes storage 1912 (e.g., hard disk drives (HDD)) and memory 1913 (e.g., RAM) that can be accessed and used by the host processors 1907 and VMs 1909 for storing software code, data, etc. In one embodiment, a VM 1909 may employ the data plane APIs as disclosed herein.

Datacenter 1900 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1900 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1909 on server 19011 to run their applications 1911. When demand for an application 1911 increases, the datacenter 1900 may activate additional VMs 1909 on the same server 19011 and/or on a new server 1901N as needed. These additional VMs 1909 can be deactivated if demand for the application later drops.

Datacenter 1900 may offer guaranteed availability, disaster recovery, and back-up services. For example, the datacenter may designate one VM 1909 on server 19011 as the primary location for the tenant's application and may activate a second VM 1909 on the same or a different server as a standby or back-up in case the first VM or server 19011 fails. Database manager 1902 automatically shifts incoming user requests from the primary VM to the back-up VM without requiring tenant intervention. Although datacenter 1900 is illustrated as a single location, it will be understood that servers 1901 may be distributed to multiple locations across the globe to provide additional redundancy and disaster recovery capabilities. Additionally, datacenter 1900 may be an on-premises, private system that provides services to a single enterprise user or may be a publicly accessible, distributed system that provides services to multiple, unrelated customers and tenants or may be a combination of both.

Domain Name System (DNS) server 1914 resolves domain and host names into IP addresses for all roles, applications, and services in datacenter 1900. DNS log 1915 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 1916 monitors the health of the physical systems, software, and environment in datacenter 1900. Health monitoring 1916 provides feedback to datacenter managers when problems are detected with servers, blades, processors, or applications in datacenter 1900 or when network bandwidth or communications issues arise.

Access control service 1917 determines whether users are allowed to access particular connections and services provided at the datacenter 1900. Directory and identity management service 1918 authenticates user credentials for tenants on datacenter 1900.

Figure 20:
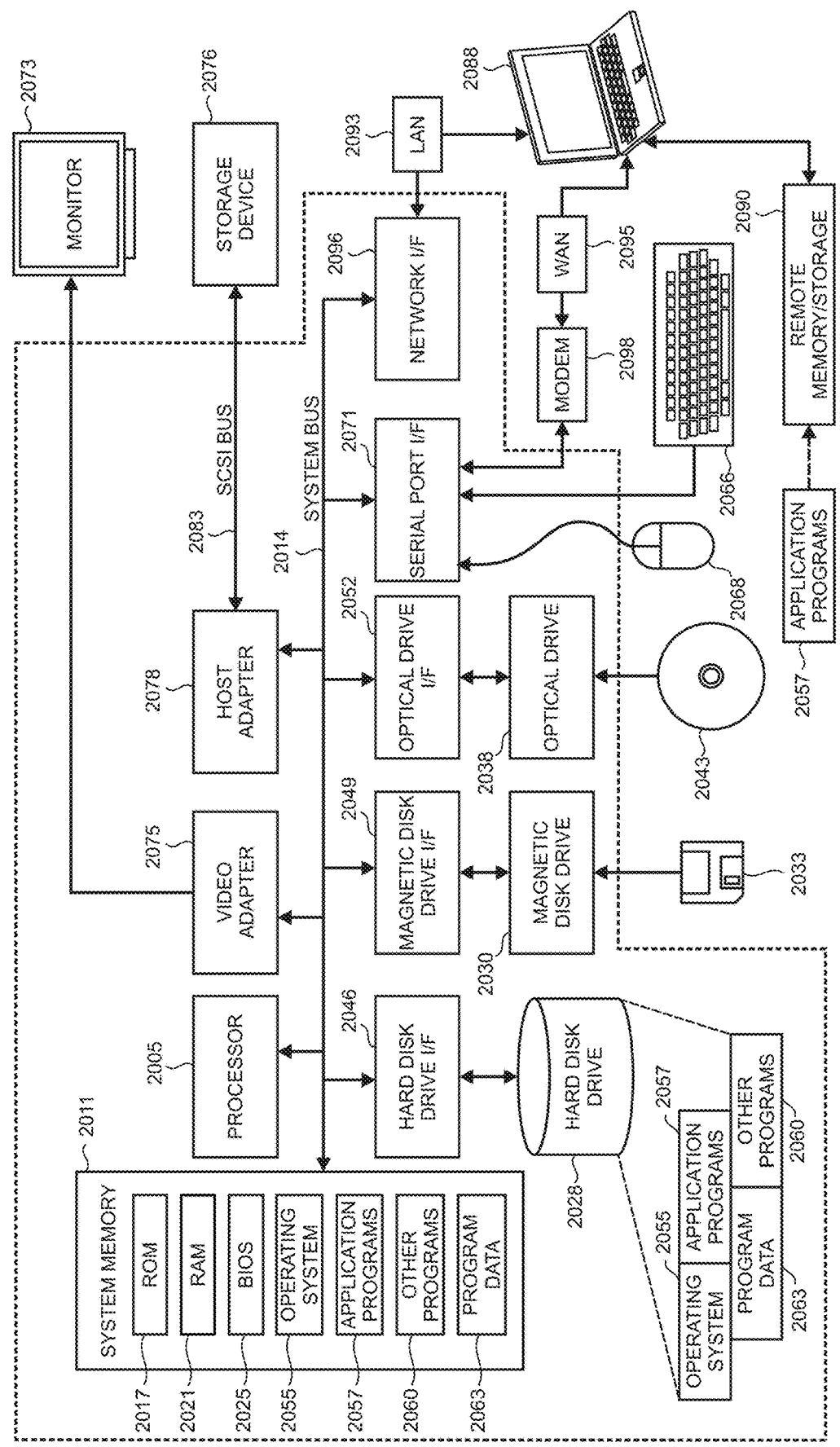
FIG. 20 is a simplified block diagram of an illustrative computer system that may be used at least in part to implement the present 5G admission by verifying slice SLA guarantees.

FIG. 20 is a simplified block diagram of an illustrative computer system 2000 such as a PC, client machine, or server with which the present 5G admission by verifying slice SLA guarantees may be implemented. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present 5G admission by verifying slice SLA guarantees. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present 5G admission by verifying slice SLA guarantees.

Various exemplary embodiments of the present 5G admission by verifying slice SLA guarantees are now presented by way of illustration and not as an exhaustive list of all embodiments. An example includes a computer-implemented method for admitting applications to a 5G (fifth generation) radio access network (RAN), comprising: allocating RAN resources among a plurality of slices in the RAN; collecting channel state information (CSI) data from user equipment (UE) that are connected to each of the plurality of RAN slices, wherein each UE supports one or more applications; receiving a request from a UE for an application on a UE to be admitted to a RAN slice that is identified in the request; using the collected CSI data to predict CSI for the requesting UE; and using the predicted CSI to determine whether the identified RAN slice meets one or more service level agreement (SLA) guarantees applicable to the identified RAN slice responsively to the application in the request being admitted to the identified slice.

In another example, the computer-implemented method further includes granting admission to the application in the request to the identified RAN slice in response to a determination that the identified RAN slice would meet the one or more SLA guarantees responsively to the application in the request being admitted to the identified slice. In another example, the computer-implemented method further includes waiting for a predefined time interval before granting or denying admission of the application in the request in response to an initial determination that the identified slice would not meet the SLA guarantees responsively to the application in the request being admitted to the identified slice. In another example, the computer-implemented method further includes, after waiting the predefined time interval, making a subsequent determination whether the identified RAN slice meets SLA guarantees responsively to the application in the request being admitted to the identified slice. In another example, the computer-implemented method further includes denying admission to the application in the request to the identified RAN slice in response to a determination that the identified RAN slice would not meet the one or more SLA guarantees responsively to the application in the request being admitted to the identified slice. In another example, the computer-implemented method further includes granting admission to the application in the request to the identified RAN slice in response to a determination that the identified RAN slice would not meet the one or more SLA guarantees responsively to the application in the request being admitted to the identified slice, wherein the admission is granted under terms that are different from the one or more SLA guarantees. In another example, the computer-implemented method further includes granting admission to the application in the request to the identified RAN slice in response to a determination that the identified RAN slice would not meet the one or more SLA guarantees responsively to the application in the request being admitted to the identified slice, wherein the admission is granted without SLA guarantees. In another example, the computer-implemented method further includes negotiating terms of admission to the application in the request to the identified RAN slice in response to a determination that the identified RAN slice would not meet the one or more SLA guarantees responsively to the application in the request being admitted to the identified slice.

A further example includes one or more hardware-based non-transitory computer-readable memory devices storing computer-executable instructions which, upon execution by one or more processor disposed in a computing device, cause the computing device to: provide a channel state information (CSI) prediction model to predict CSI for new connectivity requests to one or more radio access network (RAN) slices in a 5G (fifth generation) network from applications executing on user equipment (UE), wherein the new connectivity requests include identification of a RAN slice to which admission is sought; use the predicted CSI to determine whether granting admission to the application making the new connectivity request provides for all UE connections to the identified RAN slice to continue to meet applicable service level agreement (SLA) guarantees; use the predicted CSI to determine whether granting admission to the application making the new connectivity request provides for the new connectivity to the identified RAN slice to meet applicable SLA guarantees; grant admission to the identified RAN slice responsive to a determination that the identified RAN slice would continue to meet applicable SLA guarantees and further responsive to the determination that new connectivity to the RAN slice would meet applicable SLA guarantees; and deny admission to the identified RAN slice either responsive to a determination that the identified RAN slice would not continue to meet applicable SLA guarantees or responsive to the determination that new connectivity to the RAN slice would not meet applicable SLA guarantees.

In another example, the SLA describes technical metrics pertaining to the 5G network comprising one or more of availability, throughput, latency, bit/packet error rate, or energy. In another example, the CSI prediction model comprises a predictive propagation model. In another example, the predictive propagation model uses reinforcement learning based on CSI data from one or more online or offline sources. In another example, the online sources of CSI data comprise CSI feedback from a population of UE that is engaged in current communications sessions over the 5G network, the CSI feedback reporting dynamic channel conditions between radio transmission points in the RAN and the UE. In another example, the executed computer-executable instructions further cause the computing device to utilize predicted traffic demand to determine whether granting admission to the application making the new connectivity request provides for the new connectivity to the identified RAN slice to meet applicable SLA guarantees, in which the predicted traffic demand is based on historic traffic demand for one or more of end-user, application, or slice.

A further example includes a computing device, comprising: at least one processor; and at least one hardware-based non-transitory computer-readable storage device having computer-executable instructions stored thereon which, when executed by the least one processor, cause the computing device to dynamically configure a radio access network (RAN) in a 5G (fifth generation) network by allocating RAN resources among a plurality of slices in the RAN in response to changing traffic on the slices of the RAN from user equipment (UE) to meet one or more service level agreement (SLA) guarantees that are applicable to the RAN slices based on current UE connectivity; receive a request from an application on a UE for admission to a RAN slice that is identified in the request; attempt to identify a RAN configuration for which an allocation of RAN resources among the RAN slices enables the identified RAN slice to continue to meet all applicable SLA guarantees should the admission request from the application be granted; grant admission to the application to the identified RAN slice if the attempt to identify a RAN configuration is successful; and dynamically reconfigure the RAN by reallocating RAN resources in accordance with the successfully identified RAN configuration.

In another example, the computer-executable instructions stored on the computing device, when executed by the least one processor, further cause the computing device to deny admission to the application to the identified RAN slice if the attempt to identify a RAN configuration is unsuccessful. In another example, the RAN resources comprise one or more of radio resource block, numerology, or MIMO (massive input, massive output) layer. In another example, the allocation of RAN resources is performed in a near-real-time RAN intelligent controller. In another example, the near-real-time RAN intelligent controller interoperates with a MAC (Medium Access Control) layer component to control intra-RAN slice resource allocation. In another example, the meeting of applicable SLA guarantees is determined on a statistical basis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for admitting applications to a 5G (fifth generation) radio access network (RAN), comprising:
   allocating RAN resources among a plurality of slices in the RAN;
   collecting channel state information (CSI) data from user equipment (UE) that are connected to each of the plurality of RAN slices, wherein each UE supports one or more applications;
   receiving a request from a UE for an application on a UE to be admitted to a RAN slice that is identified in the request;
   using the collected CSI data to predict CSI for the requesting UE;
   using the predicted CSI to determine whether the identified RAN slice meets one or more service level agreement (SLA) guarantees applicable to the identified RAN slice responsively to the application in the request being admitted to the identified slice;
   waiting for a predefined time interval before granting or denying admission of the application in the request in response to an initial determination of the identified slice not meeting the SLA guarantees responsively to the application in the request being admitted to the identified slice; and
   after waiting the predefined time interval, making a subsequent determination whether the identified RAN slice meets SLA guarantees responsively to the application in the request being admitted to the identified slice.

2. The computer-implemented method of claim 1 further including granting admission to the application in the request to the identified RAN slice in response to a determination of the identified RAN slice meeting the one or more SLA guarantees responsively to the application in the request being admitted to the identified slice.

3. The computer-implemented method of claim 1 further including denying admission to the application in the request to the identified RAN slice in response to a determination of the identified RAN slice not meeting the one or more SLA guarantees responsively to the application in the request being admitted to the identified slice.

4. The computer-implemented method of claim 1 further including granting admission to the application in the request to the identified RAN slice in response to a determination of the identified RAN slice not meeting the one or more SLA guarantees responsively to the application in the request being admitted to the identified slice, wherein the admission is granted under terms that are different from the one or more SLA guarantees.

5. The computer-implemented method of claim 1 further including granting admission to the application in the request to the identified RAN slice in response to a determination of the identified RAN slice not meeting the one or more SLA guarantees responsively to the application in the request being admitted to the identified slice, wherein the admission is granted without SLA guarantees.

6. The computer-implemented method of claim 1 further including negotiating terms of admission to the application in the request to the identified RAN slice in response to a determination of the identified RAN slice not meeting the one or more SLA guarantees responsively to the application in the request being admitted to the identified slice.

7. One or more hardware-based non-transitory computer-readable memory devices storing computer-executable instructions which, upon execution by one or more processors disposed in a computing device, cause the computing device to:
provide a channel state information (CSI) prediction model to predict CSI for new connectivity requests to one or more radio access network (RAN) slices in a 5G (fifth generation) network from applications executing on user equipment (UE), wherein the new connectivity requests include identification of a RAN slice to which admission is sought;
use the predicted CSI to determine whether granting admission to the application making the new connectivity request provides for all UE connections to the identified RAN slice to continue to meet applicable service level agreement (SLA) guarantees;
use the predicted CSI to determine whether granting admission to the application making the new connectivity request provides for new connectivity to the identified RAN slice to meet applicable SLA guarantees;
grant admission to the identified RAN slice responsive to a determination that of the identified RAN slice continuing to meet applicable SLA guarantees and further responsive to the determination of new connectivity to the RAN slice meeting applicable SLA guarantees; and
deny admission to the identified RAN slice either responsive to a determination of the identified RAN slice not continuing to meet applicable SLA guarantees or responsive to the determination of new connectivity to the RAN slice not meeting applicable SLA guarantees, and
wherein the CSI prediction model comprises a predictive propagation model using reinforcement learning based on CSI data from one or more online or offline sources, and
wherein the online sources of CSI data comprise CSI feedback from a population of UE that is engaged in current communications sessions over the 5G network, the CSI feedback reporting dynamic channel conditions between radio transmission points in the RAN and the UE.

8. The one or more hardware-based non-transitory computer-readable memory devices of claim 7 in which the SLA describes technical metrics pertaining to the 5G network comprising one or more of availability, throughput, latency, bit/packet error rate, or energy.

9. The one or more hardware-based non-transitory computer-readable memory devices of claim 7 in which the executed computer-executable instructions further cause the computing device to utilize predicted traffic demand to determine whether granting admission to the application making the new connectivity request provides for the new connectivity to the identified RAN slice to meet applicable SLA guarantees, in which the predicted traffic demand is based on historic traffic demand for one or more of end-user, application, or slice.

10. A computing device, comprising:
at least one processor; and
at least one hardware-based non-transitory computer-readable storage device having computer-executable instructions stored thereon which, when executed by the least one processor, cause the computing device to
dynamically configure a radio access network (RAN) in a 5G (fifth generation) network by allocating RAN resources among a plurality of slices in the RAN in response to changing traffic on the slices of the RAN from user equipment (UE) to meet one or more service level agreement (SLA) guarantees that are applicable to the RAN slices based on current UE connectivity;
receive a request made by an application on a UE for admission to a RAN slice that is identified in the request;
attempt to identify a RAN configuration for which an allocation of RAN resources among the RAN slices enables the identified RAN slice to continue to meet all applicable SLA guarantees should the admission request from the application be granted;
grant admission to the application to the identified RAN slice if the attempt to identify a RAN configuration is successful;
dynamically reconfigure the RAN by reallocating RAN resources in accordance with the successfully identified RAN configuration;
waiting for a predefined time interval before granting admission of the application making the request in response to an initial determination of the identified slice not meeting the SLA guarantees responsively to the application in the request being admitted to the identified slice; and
after waiting the predefined time interval, making a subsequent determination whether the identified RAN slice meets SLA guarantees responsively to the application making the request being admitted to the identified slice.

11. The computing device of claim 10 in which the computer-executable instructions stored thereon, when executed by the least one processor, further cause the computing device to deny admission to the application to the identified RAN slice if the attempt to identify a RAN configuration is unsuccessful.

12. The computing device of claim 10 in which the RAN resources comprise one or more of radio resource block, numerology, or MIMO (massive input, massive output) layer.

13. The computing device of claim 10 in which the allocation of RAN resources is performed in a near-real-time RAN intelligent controller.

14. The computing device of claim 13 in which the near-real-time RAN intelligent controller interoperates with a MAC (Medium Access Control) layer component to control intra-RAN slice resource allocation.

15. The computing device of claim 10 in which the meeting of applicable SLA guarantees is determined on a statistical basis.

* * * * *